(12) United States Patent
Lagakos et al.

(10) Patent No.: US 7,792,395 B2
(45) Date of Patent: Sep. 7, 2010

(54) FIBER OPTIC ACCELERATION AND DISPLACEMENT SENSORS

(75) Inventors: Nicholas Lagakos, Silver Spring, MD (US); Joseph A Bucaro, Herndon, VA (US); Jacek Jarzynski, Bethesda, MD (US); Barbara Jarzynski, legal representative, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 128 days.

(21) Appl. No.: 12/246,761

(22) Filed: Oct. 7, 2008

(65) Prior Publication Data

US 2009/0196543 A1    Aug. 6, 2009

Related U.S. Application Data

(60) Provisional application No. 61/026,296, filed on Feb. 5, 2008.

(51) Int. Cl.
    *G02B 6/00*    (2006.01)
(52) U.S. Cl. .............................. 385/12; 385/53; 385/88; 385/92; 385/94
(58) Field of Classification Search .................... 385/12, 385/53, 88, 92, 94
    See application file for complete search history.

(56) References Cited

U.S. PATENT DOCUMENTS 5,301,001 A    4/1994    Murphy et al.
5,832,157 A    11/1998   Berthold et al.
6,571,639 B1   6/2003    May et al.
6,671,055 B1   12/2003   Wavering et al.
6,998,599 B2   2/2006    Lagakos et al.
7,020,354 B2   3/2006    Lagakos et al.
7,149,374 B2   12/2006   Lagakos et al.
7,187,453 B2   3/2007    Belleville (Continued)

FOREIGN PATENT DOCUMENTS

JP    8201196 A    *    8/1996

OTHER PUBLICATIONS

Meyer-Arendt, J.R., "Introduction to Classical and Modern Optics", 4th Ed., Prentice Hall, Englewood Cliffs, NJ, 1995, pp. 353-355.

(Continued)

*Primary Examiner*—Jennifer Doan
(74) *Attorney, Agent, or Firm*—Amy L. Ressing; Sally A. Ferrett

(57) ABSTRACT

A fiber optic sensor for detecting acceleration or displacement includes a fiber optic probe with a multimode transmitting optical fiber, a multimode receiving optical fiber and a edge reflector spaced apart from the fiber probe. The reflector moves in a transverse direction substantially normal to the longitudinal axis of the fiber optic probe, so the amount of light received by the receiving fiber indicates a relative acceleration or a relative displacement of the reflective surface with respect to the fiber probe in the transverse direction of motion of the edge of the reflector. The reflector can be mounted on a cantilever beam. The sensor can have one transmitting fiber, two receiving fiber, and a reflector with two edges, each edge partially covering one of the receiving fibers. A triaxial sensor system has at least two two-fiber sensors.

15 Claims, 32 Drawing Sheets

U.S. PATENT DOCUMENTS

| | | | |
|---|---|---|---|
| 7,187,816 | B2 | 3/2007 | Huang |
| 7,379,630 | B2 | 5/2008 | Lagakos et al. |
| 7,460,740 | B2 | 12/2008 | Lagakos et al. |
| 7,465,916 | B2 * | 12/2008 | Horimoto et al. ...... 250/227.11 |
| 2003/0015768 | A1 | 1/2003 | Bosco et al. |
| 2005/0157305 | A1 | 7/2005 | Yu et al. |
| 2006/0005603 | A1 | 1/2006 | Chau et al. |
| 2006/0072887 | A1 | 4/2006 | Lagakos et al. |
| 2006/0072888 | A1 | 4/2006 | Lagakos et al. |

OTHER PUBLICATIONS

G. He and F.W. Cuomo, "Displacement Response, Detection Limit, and Dynamic Range of Fiber-Optic Lever Sensors", J. Lightwave Technology, vol. 9, pp. 1618-1625, Nov. 1991.

J.A. Bucaro and N. Lagakos, "Fiber Optics Pressure and Acceleration Sensors", Proceeding of the 47th International Instrument symposium, Denver, CO (May 6-10, 2001).

M. Shimada, Y. Kinefuchi, and K. Takahashi, "Sleeve-Type Ultra Miniature Optical Fiber Pressure Sensor Fabricated by DRIE", IEEE Sensors Journal, vol. 8, No. 7, Jul. 2008, pp. 1337-1341.

A.J. Zuckerwar, F. W. Cuomo, T.D. Nguyen, Stephen A. Rizzi and Sherman A. Clevenson "High-temperature fiber-optic lever microphone" J.Acoust. Soc. Am. 97 (6), Jun. 1995 pp. 3605-3616.

A. Hu, F.W. Cuomo and A. J. Zuckerwar, "Theoretical and experimental study of a fiber optic microphone" J. Acoust. Soc. Am 91 (5), May 1992 pp. 3049-3056.

J.A. Bucaro and N. Lagakos, Lightweight Fiber Optics Microphones and Accelerometers, Review of Scientific Instruments. vol. 72 pp. 2816-2821 (Jun. 2001).

D.R. Miers, D. Raj and J.W. Berthold, "Design and Characterization of Fiber-Optic Accelerometers" Proc. Fiber Optic Laser Sensor V, DPIE vol. 838, pp. 314-317 (1987).

N.Lagakos, J. H. Cole, and J. A. Bucaro, "Microbend Fiber-optic Sensor," Applied Optics 26, p. 2171-2180 (Jun. 1987).

Krohn, D.A., Fiber Optic Sensors—Fundamentals and Applications, Instrument Society of America, Research Triangle Park, NC, Chapters 3 and 8, 1992.

International Search Report and Written Opinion in PCT/US2009/032196 dated Mar. 25, 2009 (5 pages).

* cited by examiner

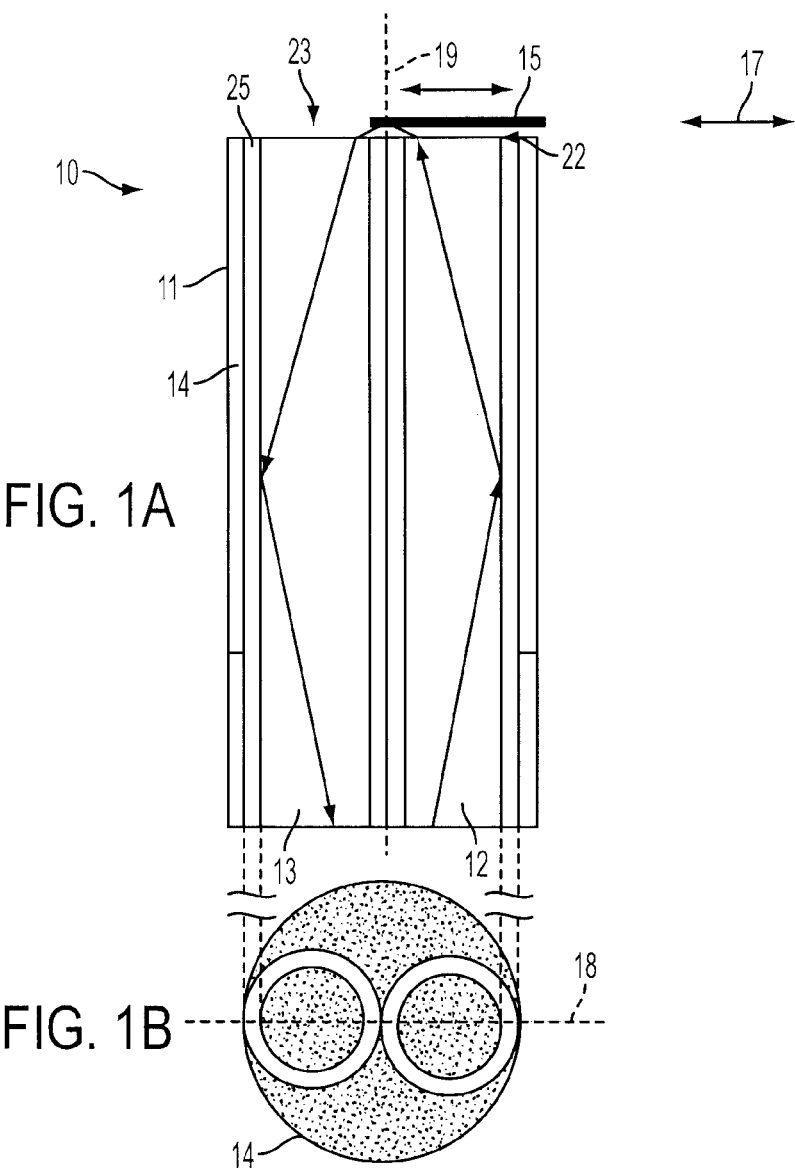
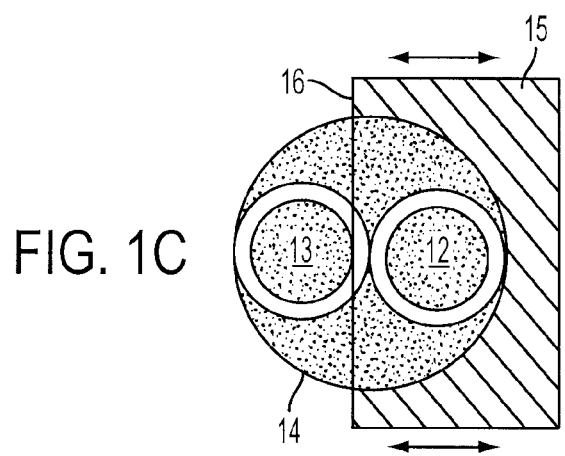
FIG. 1A
FIG. 1B
FIG. 1C

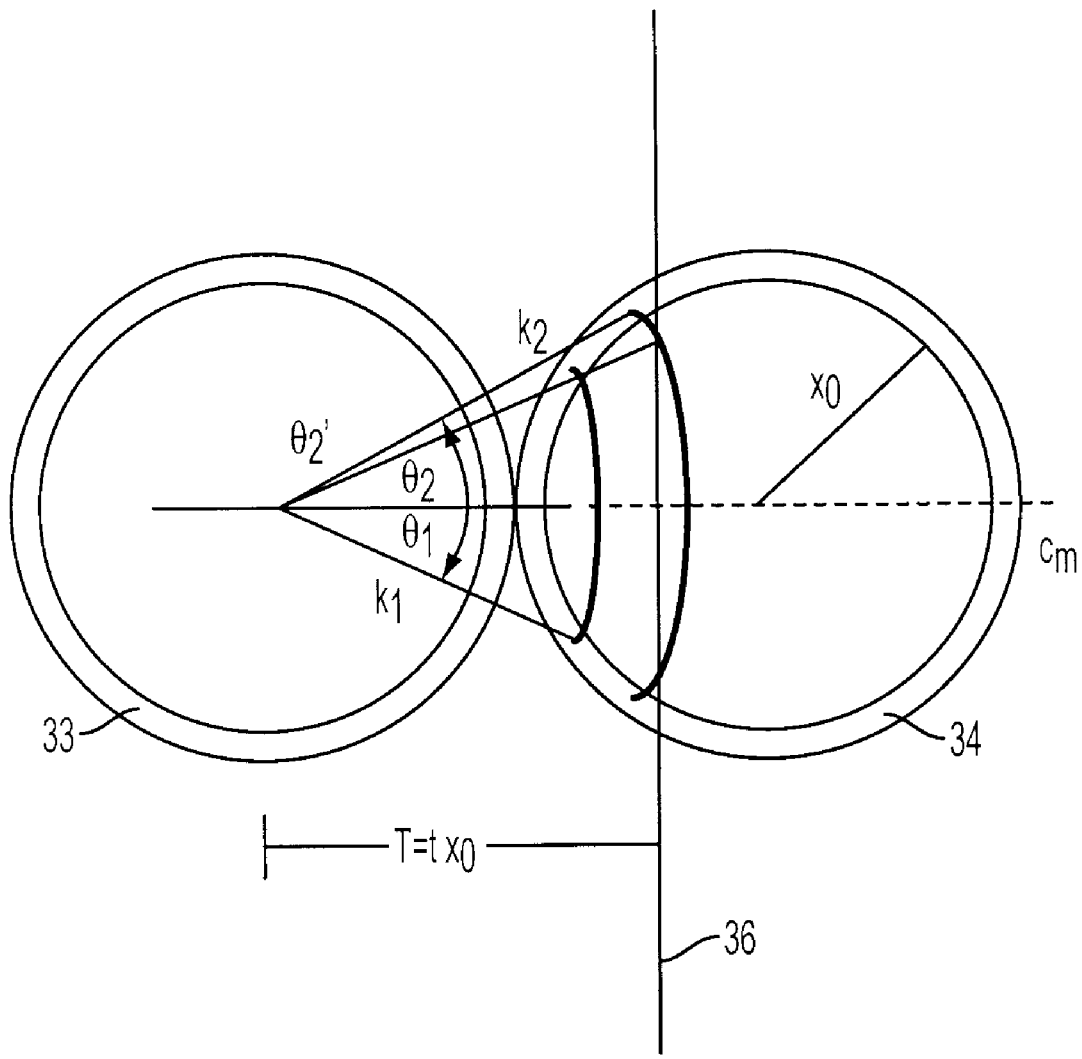
IMAGE OF EDGE OF REFLECTING STRIP
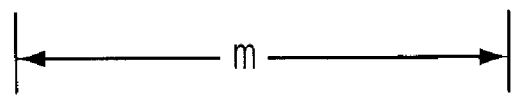
FIG. 4

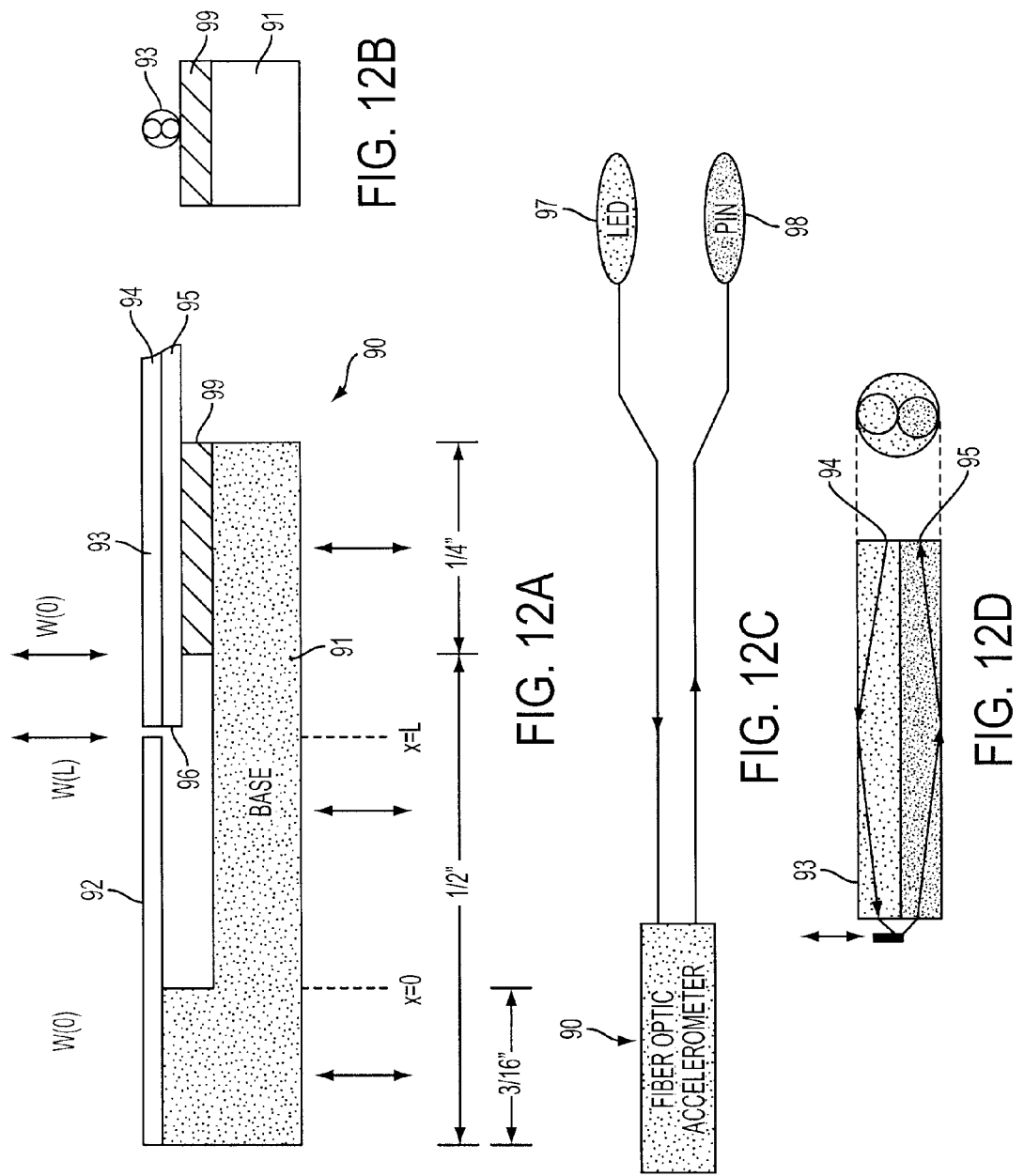

IMAGE PLANE

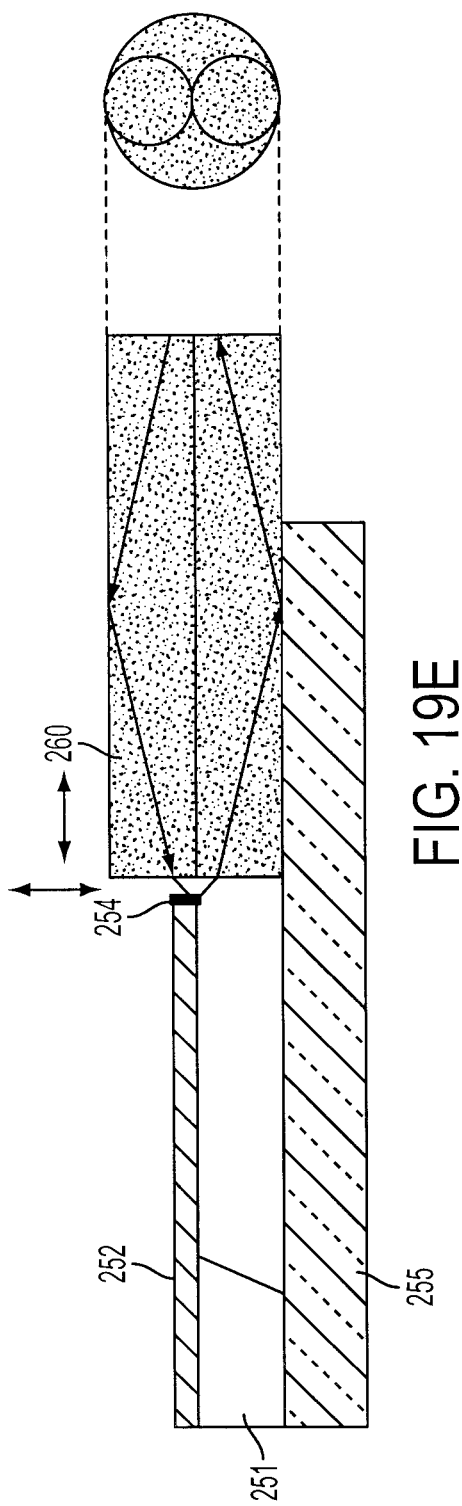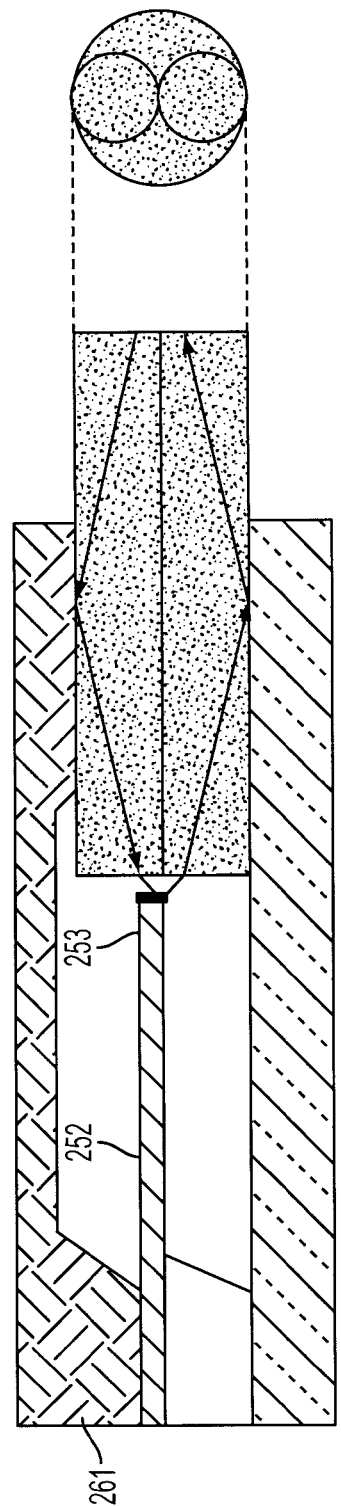
FIG. 19E
FIG. 19F

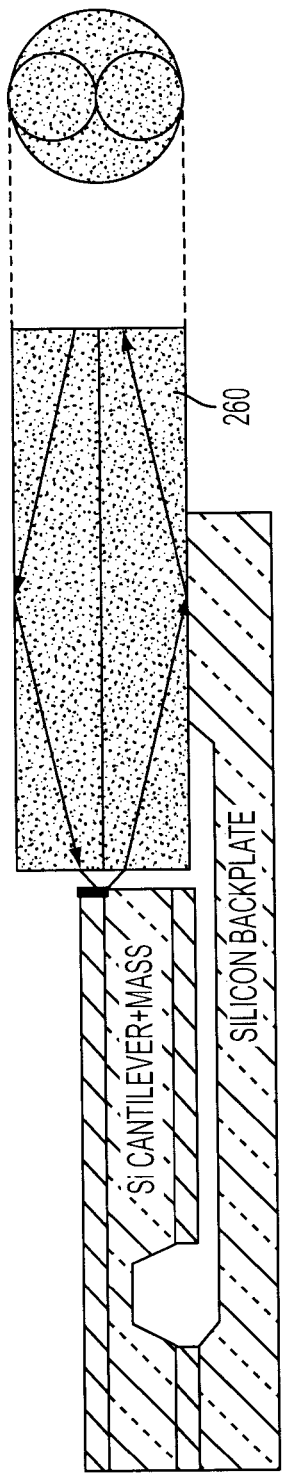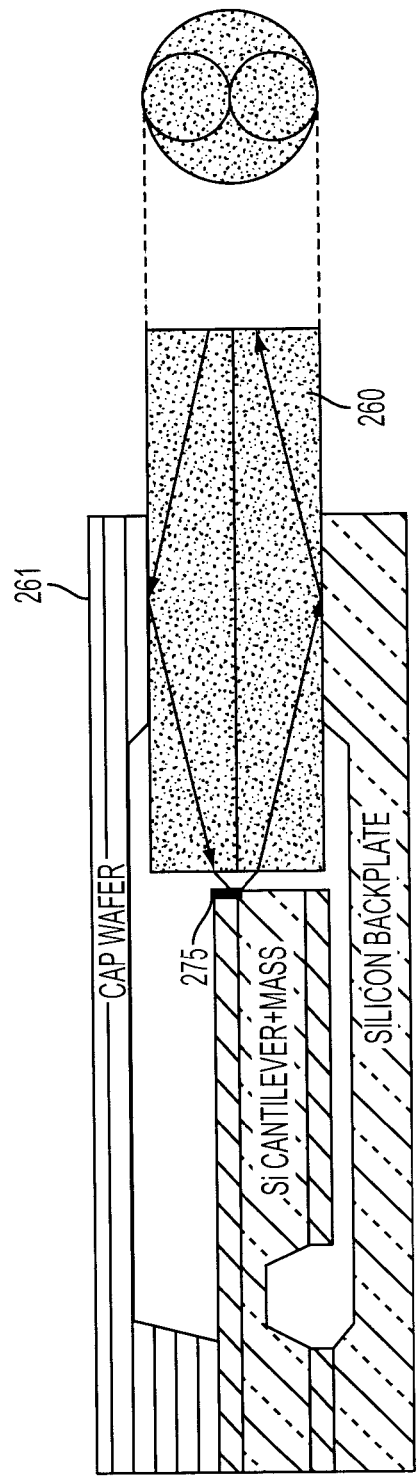
FIG. 20E
FIG. 20F

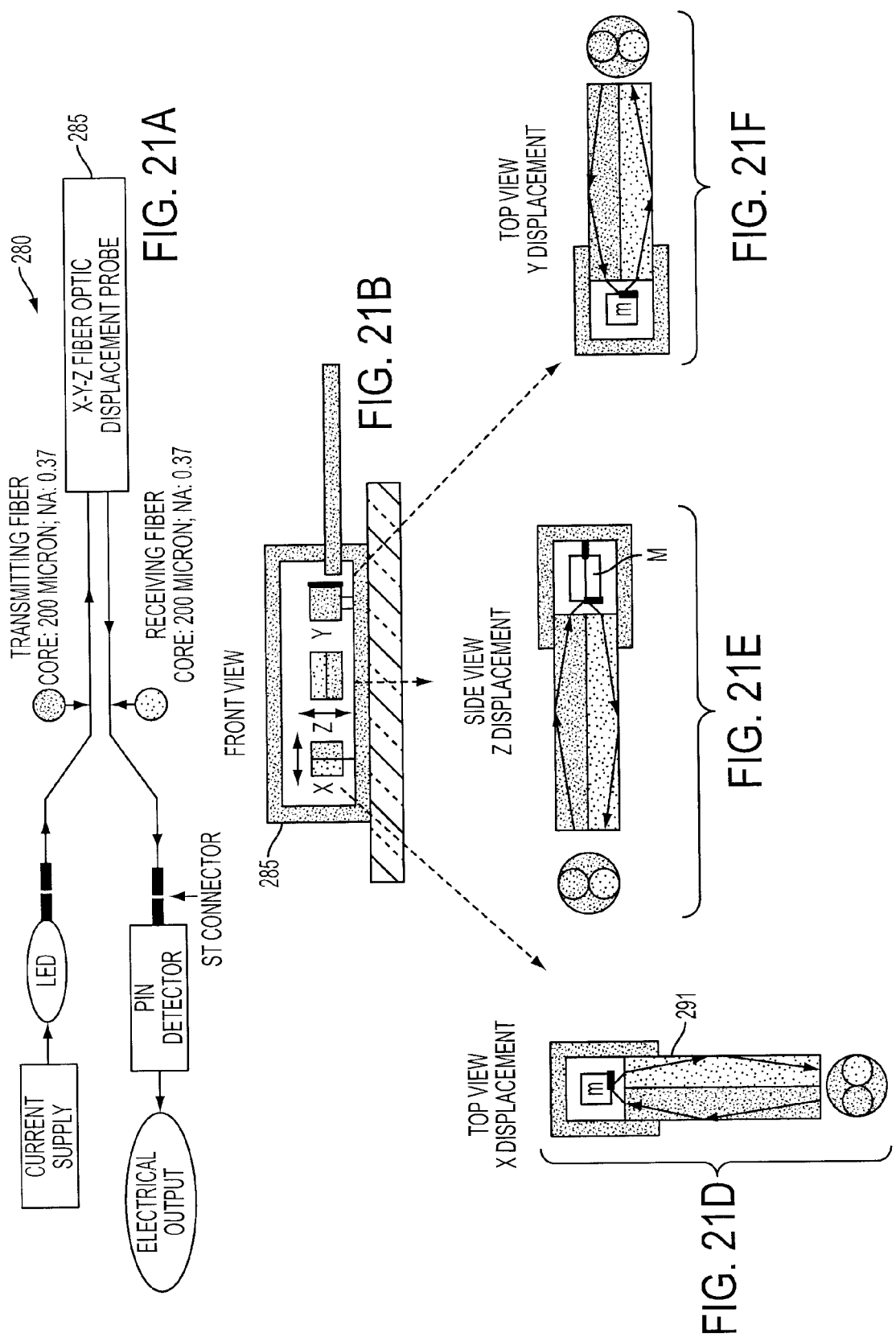

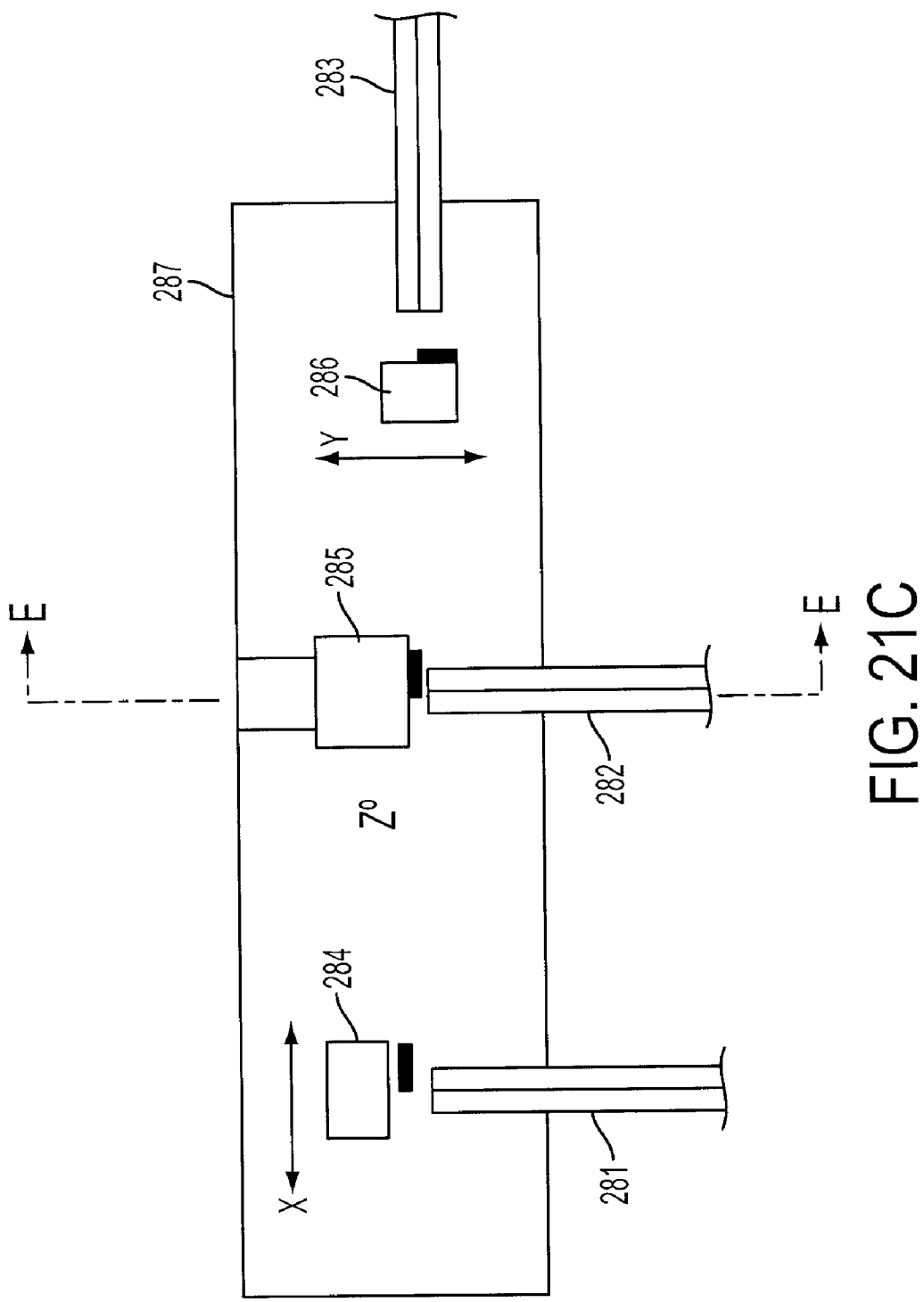

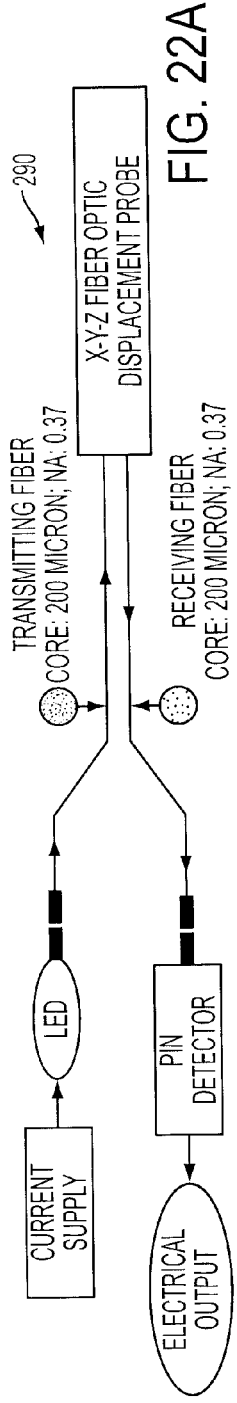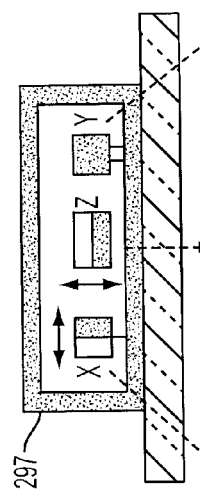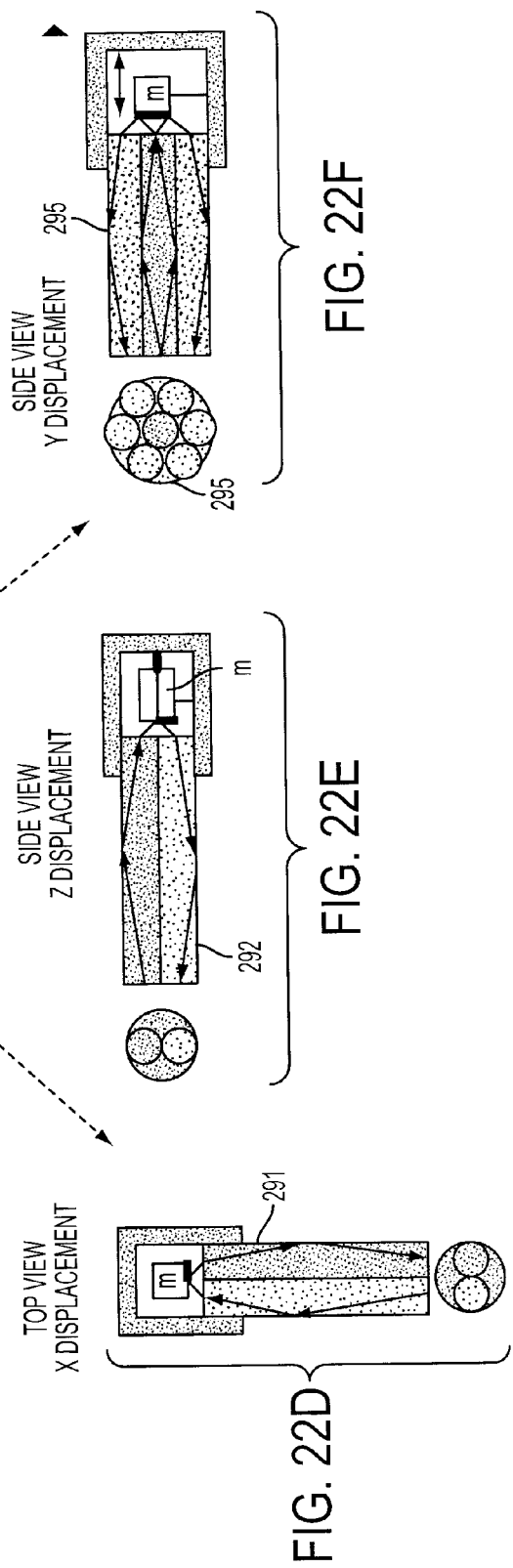

FIBER OPTIC ACCELERATION AND DISPLACEMENT SENSORS

CROSS-REFERENCE TO RELATED APPLICATIONS

This Application is a non-provisional of provisional (35 USC 119(e)) application 61/026,296 filed on Feb. 5, 2008, the disclosure of which is incorporated by reference herein in its entirety.

BACKGROUND

1. Technical Field

This application is related generally to the field of sensors for displacement and acceleration, and more specifically, to fiber optic sensors for displacement and acceleration.

2. Related Technologies

Many commercially available accelerometers use a sensing element formed of PZT, which generates a small electrical current or voltage when acceleration is sensed. This small electrical signal is usually amplified. The PZT-based sensors typically require a bias electrical voltage for optimum performance. Such sensor systems can be bulky, expensive, and subject to electromagnetic interference. Remote control and multiplexing of these sensors can also be difficult.

In recent years, fiber optic sensors have been developed to measure displacement, acceleration, strain, temperature, pressure, electrical and magnetic fields, and other environmental effects. Some examples are provided in G. He and F. W. Cuomo, J. Lightwave Technology, Vol. 9, pages 1618-1625, 1991. Several interferometry based sensors are disclosed in U.S. Pat. No. 5,301,001 to Murphy et al., U.S. Pat. No. 6,571,639 to May et al., U.S. Pat. No. 5,832,157 to Berthold et al., U.S. Pat. No. 7,187,816 to Huang et al., and U.S. Pat. No. 6,671,055 to Wavering et al.

BRIEF SUMMARY

An aspect of the invention is directed to a fiber optic sensor for detecting acceleration or displacement. The sensor includes a fiber optic probe and a reflective surface spaced apart from the fiber probe. The fiber optic probe has a transmitting multimode optical fiber and at least one receiving multimode optical fiber, the transmitting fiber and the receiving fiber being substantially parallel to a longitudinal axis of the probe. The reflective surface is able to move in a direction substantially normal to the longitudinal axis of the fiber optic probe, and has an edge extending over at least one of the optical fiber ends. In operation, the transmitting fiber transmits light toward the reflector, said reflector transmits a portion of the light toward the receiving fiber, and an amount of light received by the receiving fiber indicates a relative acceleration or a relative displacement of the reflective surface with respect to the fiber probe in the direction of motion of the reflective surface.

The sensor can include a cantilever with one end of the cantilever fixed to a structure for measurement of the acceleration or displacement of the structure, and the reflective surface being positioned at the free end of the cantilever. The amount of light received by the receiving fiber indicates a relative acceleration at frequencies below the spring-mass resonance frequency of the sensor, and indicates the relative displacement at frequencies above the spring-mass resonance frequency of the sensor. A housing can enclose the end of the fiber probe and the cantilever, with the housing being fixed to the structure and the fixed end of the cantilever being fixed to the housing An aspect of the invention is directed to a fiber optic sensor for detecting acceleration or displacement that includes a fiber optic probe having a transmitting multimode optical fiber and at least two receiving multimode optical fibers, and a reflective surface spaced apart from the probe and extending over the transmitting fiber, the reflective surface having an edge extending over a first of the receiving fibers and a second edge extending over a second of the receiving fibers. The transmitting fiber and the receiving fibers are substantially parallel to a longitudinal axis of the probe. The reflective surface moves in a direction substantially normal to the longitudinal axis of the fiber optic probe. In operation, said transmitting fiber transmits light toward the reflector, the reflector reflects a portion of the light toward the receiving fibers, and an amount of light received by the receiving fibers indicates a relative acceleration or a relative displacement of the reflective surface with respect to the fiber probe in the direction of motion of the reflective surface.

The reflective surface can be mounted to the free end of a cantilever, and in operation, the fixed end of the cantilever is fixed to a structure for measurement of the acceleration or displacement of the structure.

An aspect of the invention is directed to a method for forming a fiber optic acceleration or displacement sensor having an edge reflector fixed to a cantilever. The method includes providing a silicon wafer with a epitaxial layer of silicon dioxide, etching away a portion of the silicon wafer to form a thin silicon dioxide cantilever, depositing a reflecting strip on an end face of the silicon dioxide cantilever, affixing a silicon backplate to an unetched portion of the silicon wafer, and affixing a fiber optic probe in position so an end of a transmitting fiber and an end of a receiving fiber are facing the reflective surface with an edge of the reflective strip overlying at least one of the transmitting fiber and the receiving fibers.

The method can also include positioning a cap wafer over the cantilever and the fiber probe, and adhering the cap wafer to the fiber probe and to a fixed end of the cantilever, with a free end of the cantilever free to vibrate in response to the displacement or acceleration of the backplate in a transverse direction with respect to a longitudinal axis of the fiber probe.

BRIEF DESCRIPTION OF THE DRAWINGS

FIGS. 1A, 1B, and 1C illustrate an example of a fiber optic acceleration and displacement sensor in accordance with an embodiment of the invention.

FIG. 4 illustrates a top view of an image plane of the fiber sensor of FIG. 1A-1D and FIG. 2.

FIG. 12A-12D illustrate a fiber optic sensor system having a two-fiber optical acceleration and displacement sensor, a LED light source, and photodetector.

FIG. 19A-19F illustrate steps in a method for forming a micro-machined cantilever for use in fiber optic acceleration and displacement sensors in accordance with embodiments of the invention.

FIG. 20A-20F illustrate steps in a method for forming a fiber optic acceleration and displacement sensor having a cantilever with a larger mass.

FIG. 21A-21F illustrate an embodiment of a triaxial fiber optic sensor system.

FIG. 22A-22F illustrate an embodiment of a triaxial fiber optic sensor system.

Figure 2:
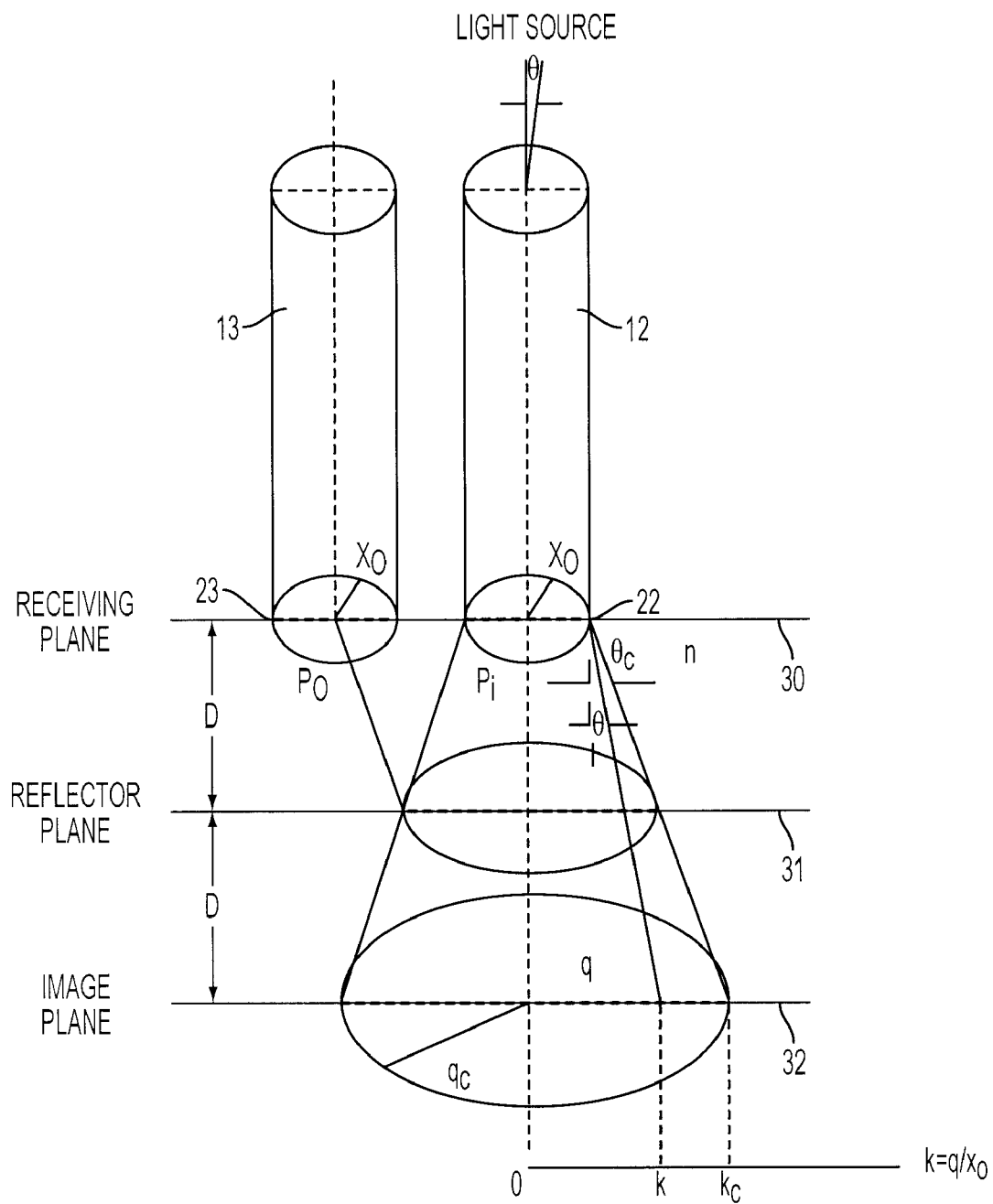
FIG. 2 illustrates the end of the fiber optic sensor including the fiber optic probe and an edge reflector in more detail.

Additional details of aspects of the invention will be apparent from the drawing figures and the following detailed description.

DETAILED DESCRIPTION OF EMBODIMENTS OF THE INVENTION

FIGS. 1A, 1B, and 1C illustrate basic principals of an intensity modulated fiber optic displacement and acceleration sensor 10 in accordance with an embodiment of the invention. The sensor 10 includes a fiber optic probe 11 having two multimode optical fibers, including a transmitting optical fiber 12 and a receiving optical fiber 13, each of which has a well polished fiber end 22 and 23. At the opposite end of the transmitting fiber 12 is a light emitting diode (LED) or other light source. A photodetector is positioned at the opposite end of the receiving fiber 13 for receiving light from the sensor 10 via the receiving fiber. Other components and connectors can be arranged between the LED, the sensor 10, and the photodetector.

As seen in FIG. 1B, the multimode optical fibers 12 and 13 each have a large core 24 and a cladding 25 with a lower index of refraction than that of the core. The two multimode optical fibers 12 and 13 are arranged within a housing 14, which can be a stainless steel tube or other material or shape. The fibers can be epoxied in place, after which the ends of the fibers are highly polished.

An edge reflector 15 is spaced apart a small distance from the polished fiber ends 22 and 23. Air, or another material that is substantially transparent at the operating wavelength of the sensor, fills the space between the polished ends of the optical fibers 12 and 13 and the edge reflector 15.

FIG. 1C is an end view of the sensor 10, showing the edge reflector 15 in an at-rest position. Note that the reflector covers the entirety of the transmitting fiber 12, and a small portion of the receiving fiber 12.

In operation, light from the LED is transmitted through the transmitting fiber 12, is emitted from the polished fiber end 22, and reflected by the edge reflector 15. Part of the reflected light is coupled into the polished end 23 of the receiving fiber 12. The multimode receiving fiber 13 guides the light to the photodetector.

The fraction of the light emitted from the polished fiber end 22 that is reflected back into the receiving fiber end 23 depends on the distance between the reflector 15 and the fiber ends 23 and 22 and on the transverse or lateral position of the reflector. If the distance is held constant, hand the edge reflector is moved laterally, or in the plane of the reflector ("in-plane"), a greater or smaller amount of light will be reflected back into the receiving fiber end 23. Thus, in-plane vibration of the reflector 15 will modulate the detected light power at the photodetector. This principal is used for measuring the acceleration and displacement of the edge reflector relative to the sensor fiber ends.

Figure 3:
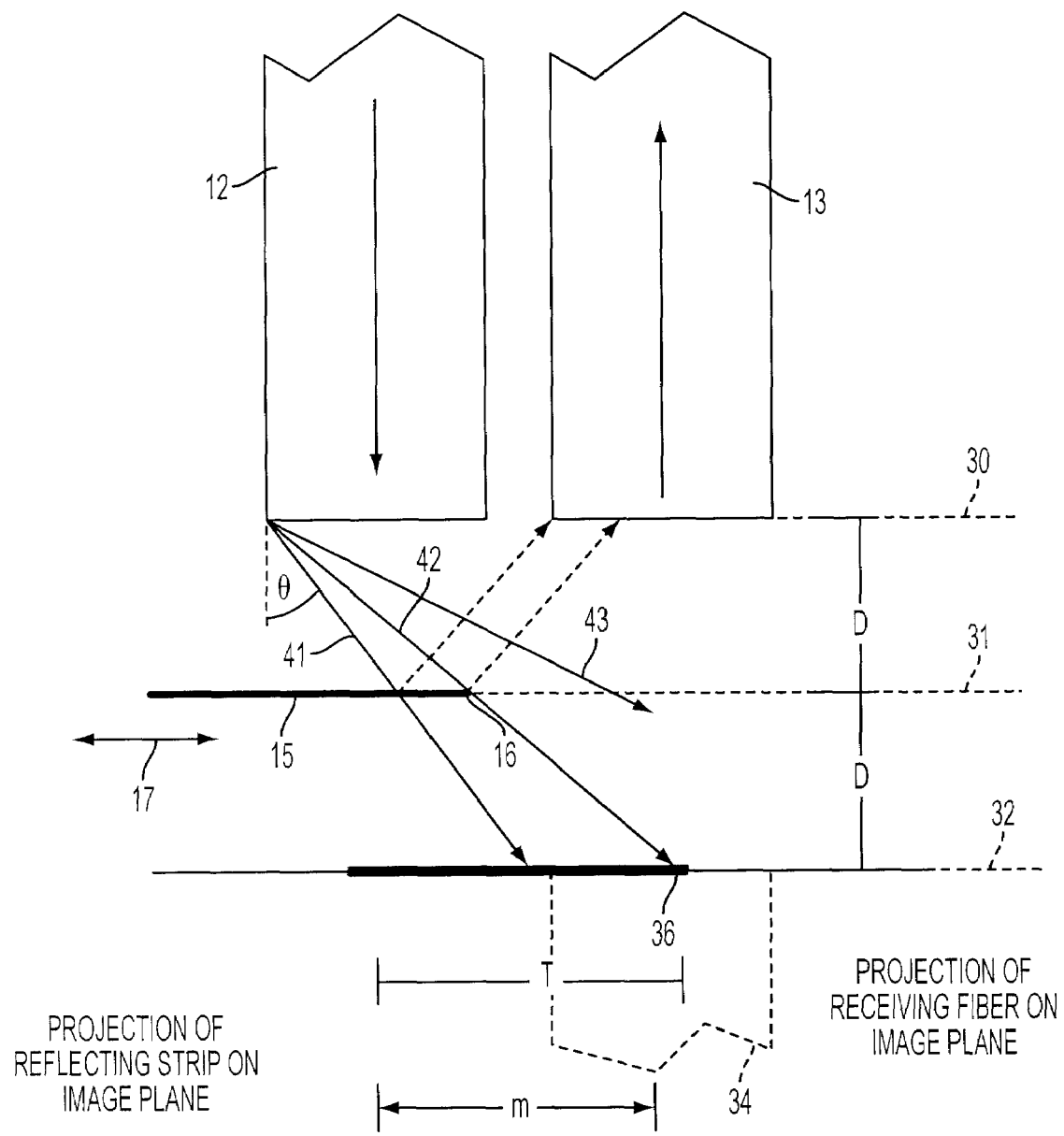
FIG. 3 illustrates a side view of the fiber optic probe, the reflector plane, and the image plane for the fiber optic sensor of FIG. 1A-1D and FIG. 2.

Without wishing to be bound by this theory, the following discussion of an equal power model is provided to aid in understanding the basis for the sensors described herein. The expanded view of FIG. 2 illustrates the end of the fiber optic sensor 10 and its relationship to the edge detector in operation in more detail. FIG. 3 illustrates a top view of the image plane of the fiber sensor 10.

Light is emitted from the polished fiber end 22 of the transmitting fiber 12, is reflected by the edge reflector 15. Part of the reflected light is coupled into the polished end 23 of the receiving fiber 12, and is transmitted to the photodetector. The reflector 15 has a sharp, straight edge 16 which vibrates in a direction 17 transverse to the receiving fiber. The reflector edge is perpendicular to a line 18 drawn through the centerlines of the fibers 12 and 13. The ac output light power from the receiving fiber is proportional to the transverse vibration of the edge of the reflecting surface, which is the distance that the edge 16 moves in the transverse direction.

Thus, the light power is indicative of the in-plane displacement of the edge of the reflecting surface, where the term "in plane" corresponds to "in the plane of the reflecting surface" if the reflecting surface is perpendicular to the longitudinal axis or centerline 19 of the fiber probe 11 as shown in FIG. 1. It is also possible that the reflecting surface is not perpendicular to the longitudinal axis of the fiber probe. In such an instance, the "in plane" displacement is the displacement in the plane that is perpendicular to the longitudinal axis of the fiber probe.

FIGS. 2, 3, and 4 illustrate some geometrical aspects of the fiber sensor 10 used in an equal-power model analysis of the fiber sensor.

The following discussion about theoretical aspects of the sensors is provided for information, without limiting the invention to any particular theory of operation.

The light source illuminating the transmitting fiber will contain beams arriving from all angles $\theta$ with respect to the fiber axis. The rays with an angle $\theta \leq \theta_c$ will couple into the fiber 12. The critical angle $\theta_c = \sin^{-1}(NA/n)$ is the cutoff angle determined by the fiber numerical aperture NA and the refractive index n of the surrounding medium. Similarly, the light rays exiting the end of the transmitting fiber 12 will form a cone with a maximum angle $\theta_c$. The beam in the direction between $\theta$ and $\theta_c$ is defined as a uniangular beam for $0 \leq \theta \leq \theta_c$ and the reflected intensity on the receiving plane is equivalent to that on the image plane. Assume equal power illumination from uniangular beams, such that the incident light rays coming from different $\theta$ directions couple the same amount of optical power into the fiber core area based on an insignificant change of this power within a small acceptance angle.

As seen in FIG. 2, the end of the fibers are in the receiving plane 30, the edge reflector is in the reflector plane 31. The receiving plane 30 is spaced apart from the receiving plane by a distance D, and the image plane 32 is spaced apart from the reflecting plane 31 by the distance D.

The units of distance are normalized using the fiber radius $x_0$. Define $K=Q/Xo$ as a dimensionless coordinate on the image plane, and define m as $m=2+2C_m/x_0$ as the dimensionless distance between the center of the transmitting fiber 12 and the center of the receiving fiber 12. Cm is the cladding thickness. The term A is equal to $A=Xo/2D$. The boundary of the illuminated area is Kc, defined as $Kc=(Qc/Xo)=1+(2D \tan(\theta_c)/Xo)$, where K and $\theta$ are related by $\theta=\tan^{-1}[(K-1)Xo/2d] \cdot \tan \theta = x_0/2D(k-1)$. Pi is the total optical power exiting the transmitting fiber and Po as the optical power reflected back into the receiving fiber 13 by the reflector 15.

The light leaves the transmitting fiber 12 with a maximum angle $\theta c$, where $\sin \theta c = NA/n$, NA is the numerical aperture of the fiber, and n is the refractive index of the surrounding medium.

The intensity $I_k$ is defined as the reflected optical power per unit area at a location k on the receiving fiber. The location k is a point on the image 34 of the receiving fiber 13 along an arc of equal radius from the center of the image 33 of the transmitting fiber 12. The intensity $I_0$ is determined for the condition when the reflector 15 is positioned to reflect all the incident light from the transmitting fiber. The intensity $I_k$ can be determined according to the following equations:

(a) when $1 \leq k_c < 2$ and $0 \leq k \leq 2-k_c$:

$$I_k = AI_0((/1-A^2)\theta_c)[\tan^{-1}(k_c-1)-A\tan^{-1}[A(k_c-1)]]$$

(b) when $1 \leq k_c < 2$ and $2-k_c < k \leq 1$:

$$I_k = AI_0((/2(1-A)\theta_c)[\tan^{-1}(k_c-1)-A\tan^{-1}[A(k_c-1)]+\tan^{-1}(1-k))-A\tan^{-1}[A(1-k)]]$$

(c) when $k_c \geq 2$, $0 \leq k < 1$, and $k_c-k \leq 2$.

$$I_k = AI_0((/2(1-A^2)\theta_c)[(\pi/4)-A\tan^{-1}(1-k)+A\tan^{-1}(1-k)-A\tan^{-1}[A(1-k)]]+AI_0((/8\theta_c)\ln[(k_c-1)^2(1+A^2)/[1+A^2(k_c-1)^2]]$$

(d) when $k_c \geq 2$, $0 \leq k < 1$, and $k_c-k > 2$:

$$I_k = AI_0((/2(1-A^2)\theta_c)[(\pi/4)-A\tan^{-1}A+\tan^{-1}(1-k)-A\tan^{-1}[A(1-k)]]+AI_0((/8\theta_c)\ln[(k+1)^2(1+A^2)/[1+A^2(k+1)^2]]$$

(e) when $1 \leq k_c \leq 2$ and $1 \leq k \leq k_c$:

$$I_k = AI_0((/2(1-A^2)\theta_c)[\tan^{-1}(k_{cc}^{-1})-\tan^{-1}(k-1)+A\tan^{-1}[A(k-1)]-A\tan^{-1}[A(k_c-1)]]$$

(f) when $k_c > 2$, $1 \leq k \leq 2$, and $k_c-k \leq 2$:

$$I_k = AI_0((/2(1-A^2)\theta_c)[(\pi/4)-A\tan^{-1}A-\tan^{-1}(k-1)+A\tan^{-1}[A(k-1)]+AI_0((/8\theta_c)\ln[(k_c-1)^2(1+A^2)/[1+A^2(k_c-1)^2]]$$

(g) when $k_c > 2$, $1 \leq k \leq 2$, and $k_c-k > 2$:

$$I_k = AI_0((/2(1-A^2)\theta_c)[(\pi/4)-A\tan^{-1}A-\tan^{-1}(k-1)+A\tan^{-1}[A(k-1)]+AI_0((/8\theta_c)\ln[(k+1)^2(1+A^2)/[1+A^2(k_c-1)^2]]$$

(h) when $k_c > 2$, $k > 2$, and $k_c-k \leq 2$:

$$I_k = AI_0((/8\theta_c)\ln[(k_c-1)^2(1+A^2(k-1)^2/[(k-1)^2[1+A^2(k_c-1)^2]]$$

(i) when $k_c > 2$, $k > 2$, and $k_c-k > 2$:

$$I_k = AI_0((/8\theta_c)\ln[(k+1)^2(1+A^2(k-1)^2]/[(k-1)^2[1+A^2(k_c-1)^2]]$$

Only a portion of the light emitted from the transmitting fiber 12 is reflected by the reflector 15, as seen in FIG. 3. Note that rays 41 and 42 in FIG. 3 are reflected back toward the receiving fiber 12, but ray 43 does not intercept the edge reflector 15, so it is not reflected. The light that is not reflected by the reflector can be considered to be projected onto the image plane 32, located at a distance D from the plane of the reflector 15. A projection 36 of the edge of the reflector 15 on the image plane 32 is shown in a side view in FIG. 3 and in the top view in FIG. 4. A projection 33 of the transmitting fiber 12 and a projection 34 of the receiving fiber 13 are also shown in FIG. 3 and FIG. 4. Note that the projection 36 of the edge of the reflector 15 is a distance $T=tx_0$ from the center of the transmitting fiber projection 33, where $x_0$ is the radius of the receiving fiber.

The normalized reflected light power, Po/Pi, can be stated as:

$$Po/Pi=(2/\pi)\int_{m-1}^{t}(I_k/I_o)\sigma_1 k_1 dk_1+(2/\pi)\int_{t}^{Z}(I_k/I_o)\sigma_2 k_2 dk_2,$$

where the upper bound of integration for the second term is $Z=(1-m^2+2mt)^{1/2}$, $I_k/I_o$ is the normalized intensity, and $I_o$ is the intensity exiting the transmitting fiber $I_o=P_i/(2k_r x_o^2)$. The sigma terms, $\sigma_1$ and $\sigma_2$ are equal to $\sigma_1=\theta_1=\cos^{-1}[(k_1^2+m^2-1)/(2k_1 m)]$ and $\sigma_2=\theta_2-\theta$, respectively, where $\theta_2=\cos^{-1}[(k_2^2+m^2-1)/(2k_2 m)]$ and $\theta=\cos^{-1}(k/k_2)$. So, $\theta_2$ can be written in terms of k, $k_1$, and $k_2$ as $\theta_2=\cos^{-1}[(k_2^2+m^2-1)/(2k_2 m)]-\cos^{-1}(k/k_2)$.

Figure 5:
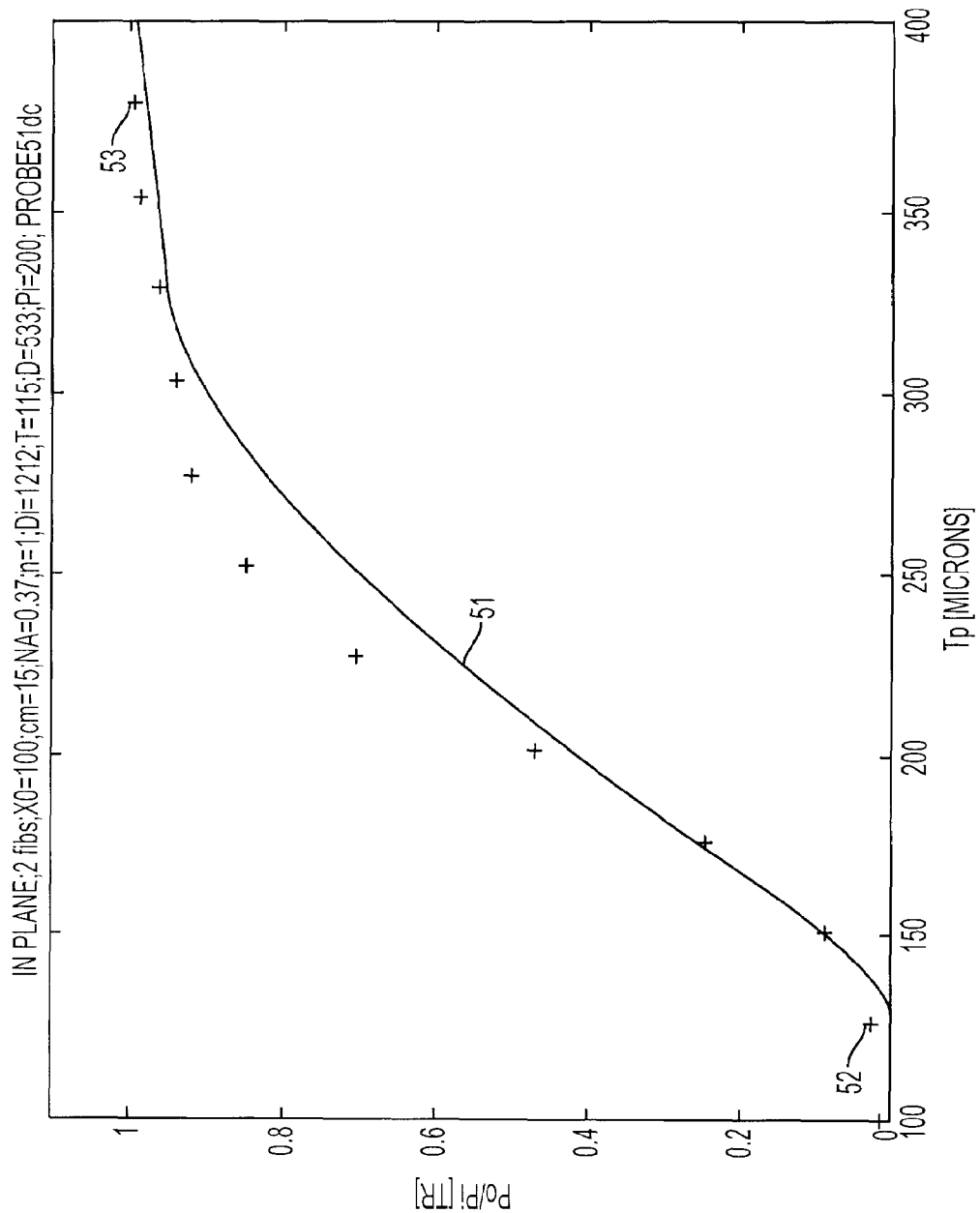
FIG. 5 illustrates predicted normalized detected light power Po/Pi as a function of T for the sensor of FIG. 1A-1D.

Note that if the reflector is absent, $P_o$ is zero. The curve 51 in FIG. 5 illustrates the normalized detected light power Po/Pi as a function of T, calculated with a MATLAB based numerical integration of the Po/Pi equation above, with the following parameters: fiber core radius Xo=100 microns, cladding thickness Cm=15 microns, numerical aperture NA=0.37, the reflector-fiber distance D is 533 microns, and the refractive index of the air between the fiber ends and the reflector is 1.0. Results from a demonstration of the FIG. 1 fiber optic probe are shown as + points in FIG. 5. The edge reflector is initially positioned extending over the core and cladding of the transmitting fiber, corresponding to point 52 in FIG. 5. The edge reflector 15 is moved until the edge reflector entirely covers the receiving fiber 13, corresponding to point 53 in FIG. 5. The curve 51 is the calculated static (or "dc") response of the fiber optic sensor. Note that the slope of the Po/Pi curve (d(Po/Pi)/dT) is the ac response to transverse vibration of the edge reflector. The largest slope is in the region of about 150 microns to about 250 microns.

Figure 6:
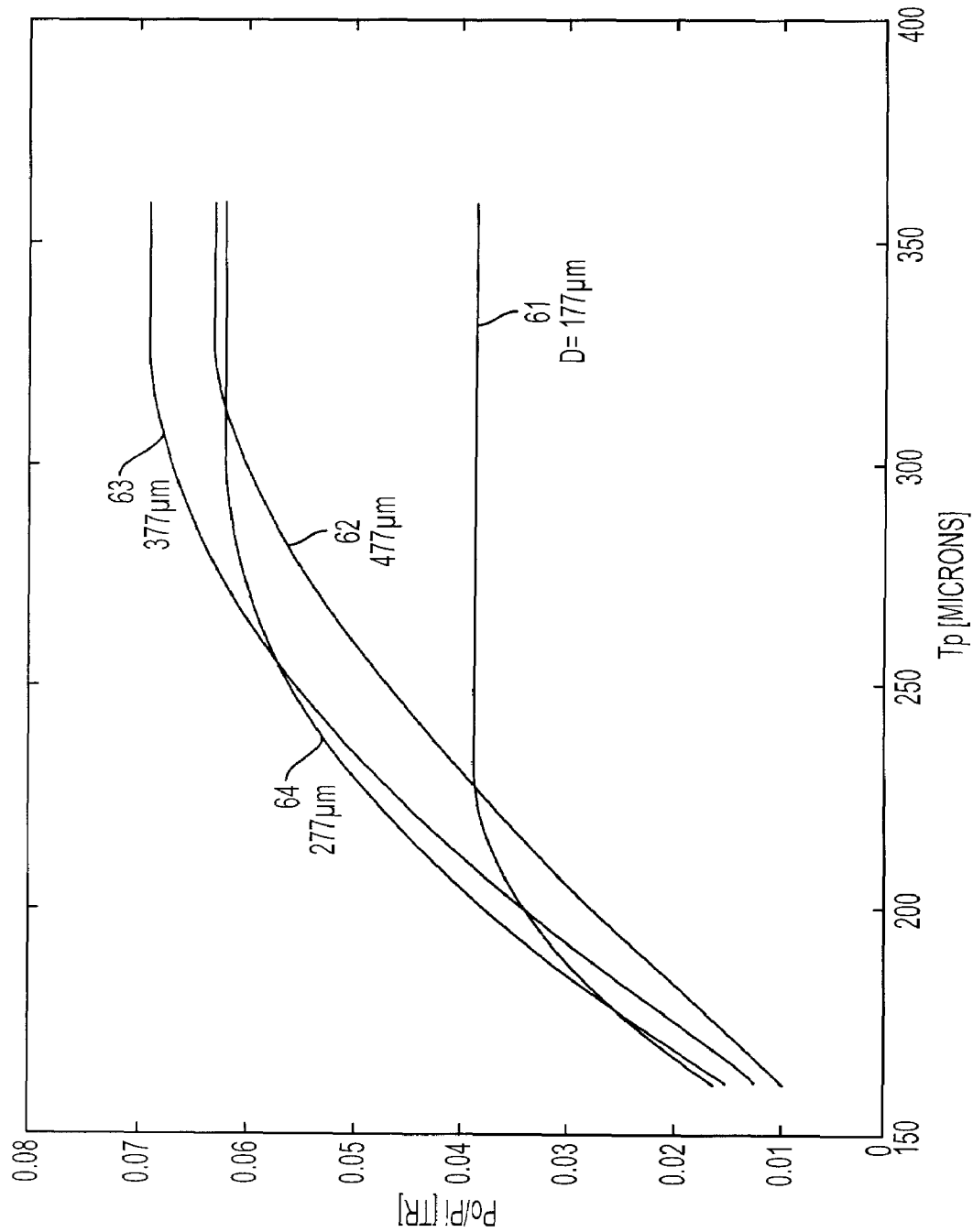
FIG. 6 illustrates the normalized detected light power Po/Pi as a function of T for several different distances between the fiber ends and the reflector.

FIG. 6 illustrates the normalized detected light power Po/Pi as a function of T for several different distances D between the fiber ends and the reflector 15. The curves 61, 62, 63, and 64 illustrate the static response for D values of 177 microns, 277 microns, 377 microns, and 477 microns, respectively. The fiber parameters are fiber core radius $x_0$=100 microns, cladding thickness Cm=15 microns, numerical aperture NA=0.37. The distance T varies between 160 microns and 350 microns. As can be seen from FIG. 6, for small fiber-reflector distances D, the detected light power is relatively low. For a constant T, as the fiber-reflector distance D increases, the detected power increases, reaches a maximum, and decreases again. Note also that the dynamic range of the sensor depends on the slope of the curve in FIG. 6, so the fiber-reflector distance D curve with the highest slope will also have produce the greatest dynamic range.

Figure 7A:
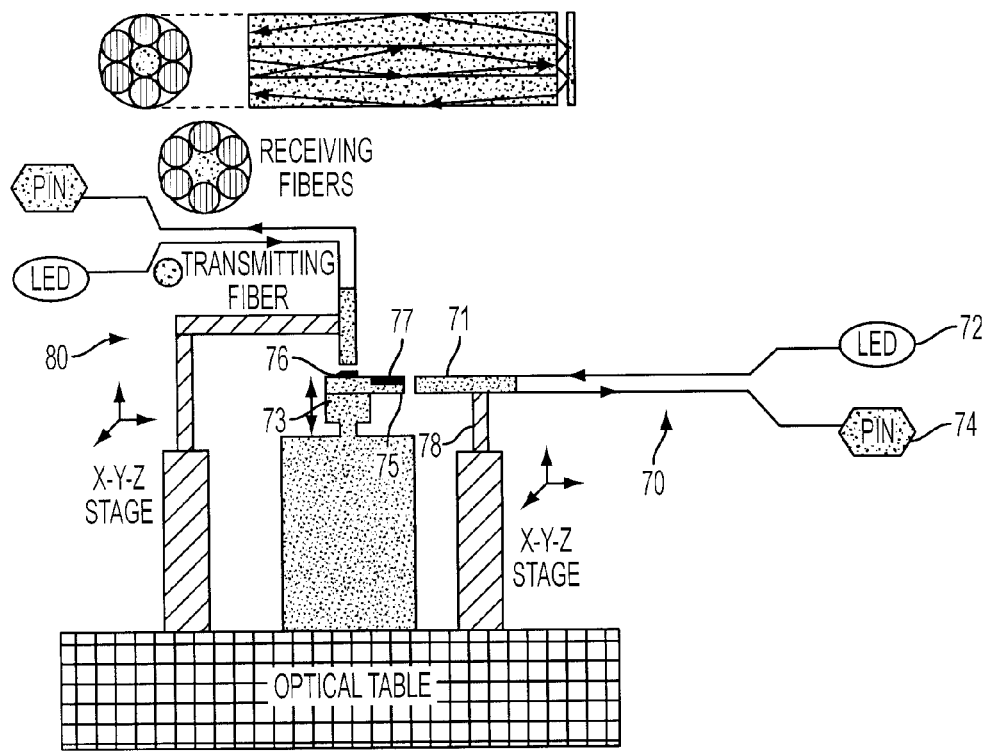
FIGS. 7A, 7B, and 7C show a demonstration set-up of a fiber optic displacement sensor.
Figure 7B:
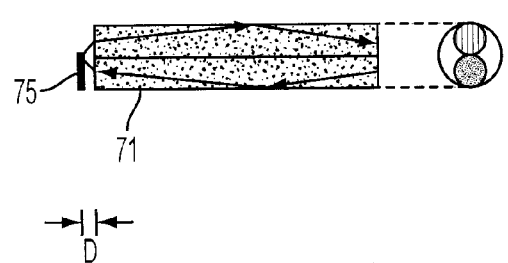
Figure 7C:
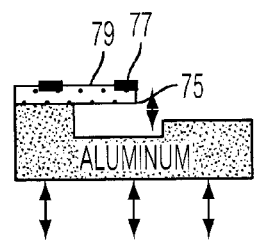

FIGS. 7A, 7B, and 7C show an exemplary embodiment of the intensity modulated fiber optic displacement fiber optic sensor 70 in a demonstration set-up. The fiber probe 71 has two optical fibers, each of which has a glass core 200 microns in diameter (Xo=100 microns), a 230 micron plastic clad (HCS, Spectran Specialty Optics), a 500 micron Tefzel coating, and a 0.37 numerical aperture. The LED light source 72 is an Optek OPF370A LED emitting light at 850 nanometer wavelength. The photodetector 74 is a silicon PIN detector. To form the probe 71, the transmitting and receiving fibers are stripped of the coating using a stripper having a 305 micron blade hole. Epoxy is applied on the 2 fibers and the fibers are forced together into a stainless steel tube. After the epoxy cures, the fiber bundle is cut at the tubing end and the fiber ends are very well polished. The fiber probe 71 is mounted on a micrometer translator 78 so the distance D between the fiber ends and the edge reflector 75 can be adjusted.

As shown in FIG. 7C, the edge reflector 70 is mounted on a vinyl cantilever beam 79 on an electromechanical vibrator. In this demonstration, the electromechanical vibrator is a Bruel and Kjaer model 4810 minishaker. The vibrator drives the cantilever beam 79 so it is displaced in the plane of the reflector 70. As the edge of the reflector 75 moves, the amount of light from the probe 705 is modulated, as discussed in the paragraphs above.

An out of plane fiber optic displacement probe 80 is also positioned near the cantilever beam 710. A second reflector 76 is affixed to the cantilever beam 79, in a position to receive and reflects light from the out-of-plane fiber optic displacement probe 80.

Figure 8:
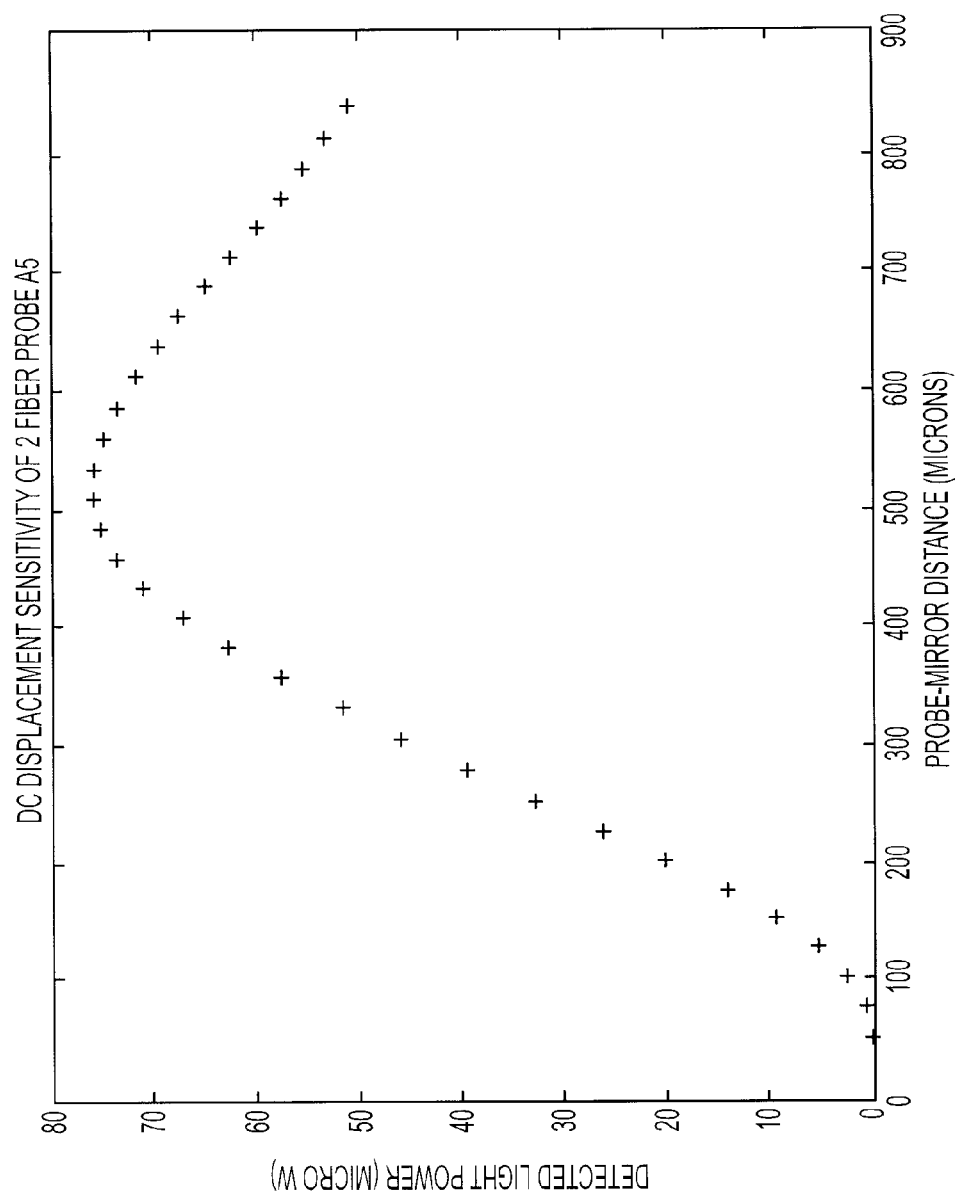
FIG. 8 illustrates the detected light power Po in microwatts as a function of the distance between the reflector and the ends of the optical fibers in the fiber optic probe.

The distance D between the reflector 75 and the end of the fibers in the fiber probe 71 can be set at a distance to optimize sensitivity. FIG. 8 illustrates the detected light power Po in microwatts as a function of the distance D between the reflector 75 and the end of the fibers in the fiber probe 71, with the probe 75 displaced in 25.4 micron increments. Note that maximum displacement sensitivity occurs when the probe-mirror distance D is between about 180 microns to about 250 microns.

The distance D can also be set to optimize ac displacement sensitivity. To determine the ac displacement sensitivity, the probe 71 can be dynamically displaced with respect to the reflector 75 by exciting the vibrator 73. The vibrator displacement amplitude can be obtained from the output of a small reference accelerometer (not shown) mounted close to the reflector.

Figure 9:
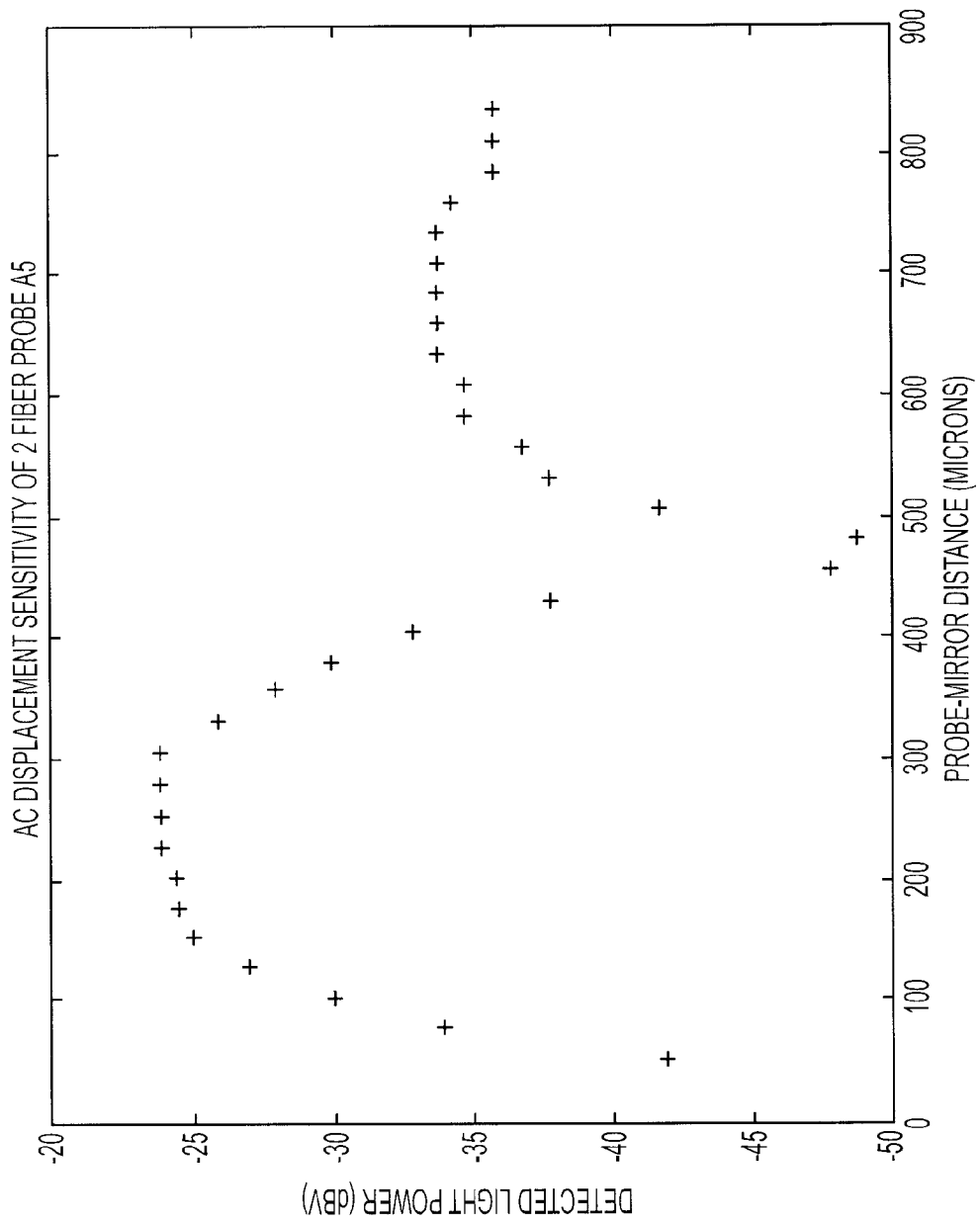
FIG. 9 shows the out-of-plane ac displacement sensitivity as a function of the distance between the reflector and the ends of the optical fibers in the fiber optic probe.

FIG. 9 shows the out-of-plane ac displacement sensitivity shown as a function of the distance D. Note that the highest ac displacement sensitivity is found in the distance D range of about 180 microns to about 250 microns.

Figure 10:
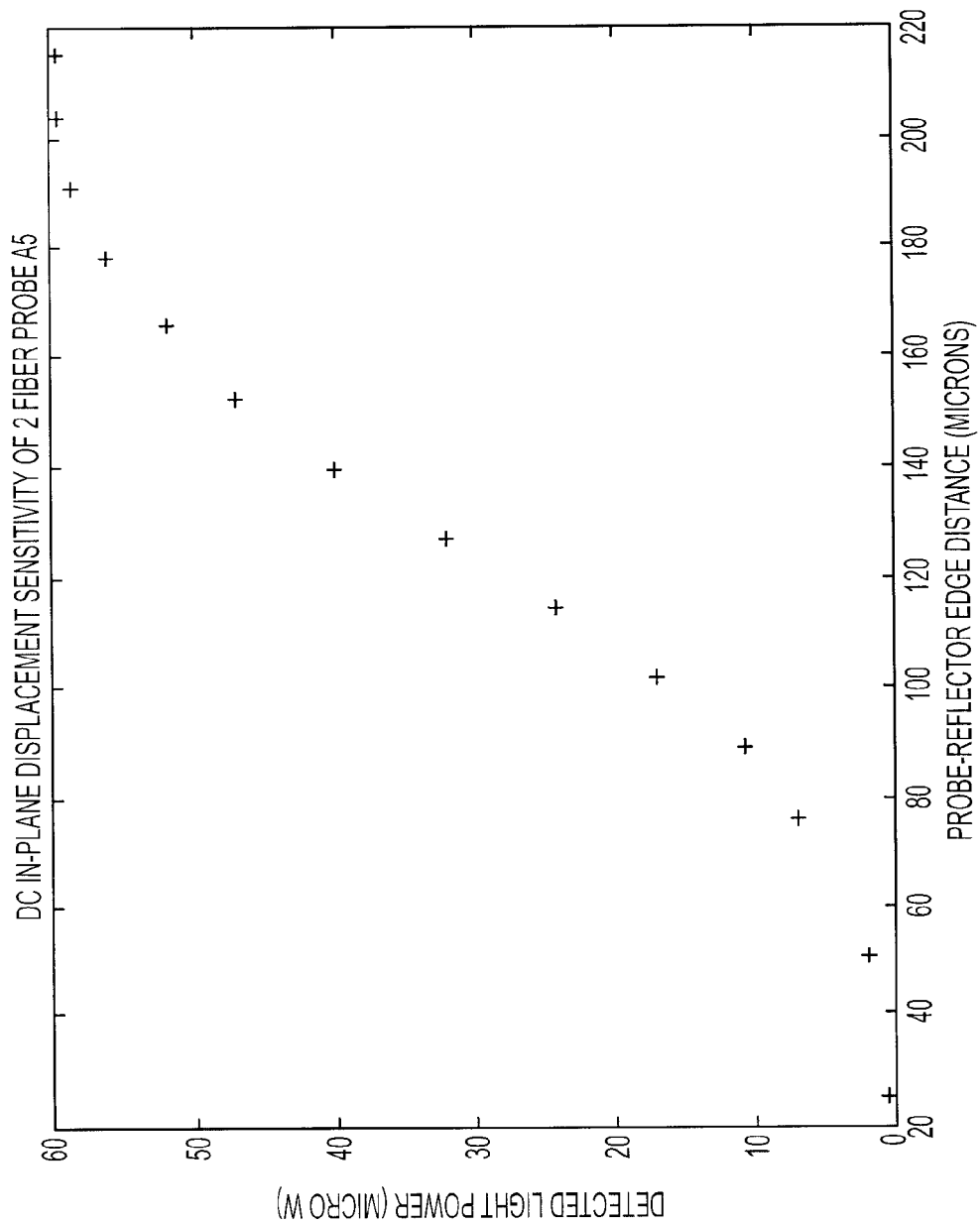
FIG. 10 shows the detected light power Po in microwatts versus the probe-reflector edge distance in microns.

The in-plane displacement sensitivity of the fiber optic probe 71 is studied by changing the relative transverse position between the ends of the probe's transmitting and reflecting fibers and the edge of the reflector. The fiber probe 705 is manually displaced using a micrometer. FIG. 10 plots the detected light power Po in microwatts versus the probe-reflector edge distance T in microns. The maximum sensitivity occurs at the location on the curve where the slope is maximum. In this example, the maximum sensitivity occurs at a distance of about 120 to about 140 microns. The maximum in-plane dc sensitivity of the fiber optic probe 71 can be calculated to be $6.3 \times 10^{-11}$ Watts per Angstrom in the range of T=120-140 microns.

Figure 11:
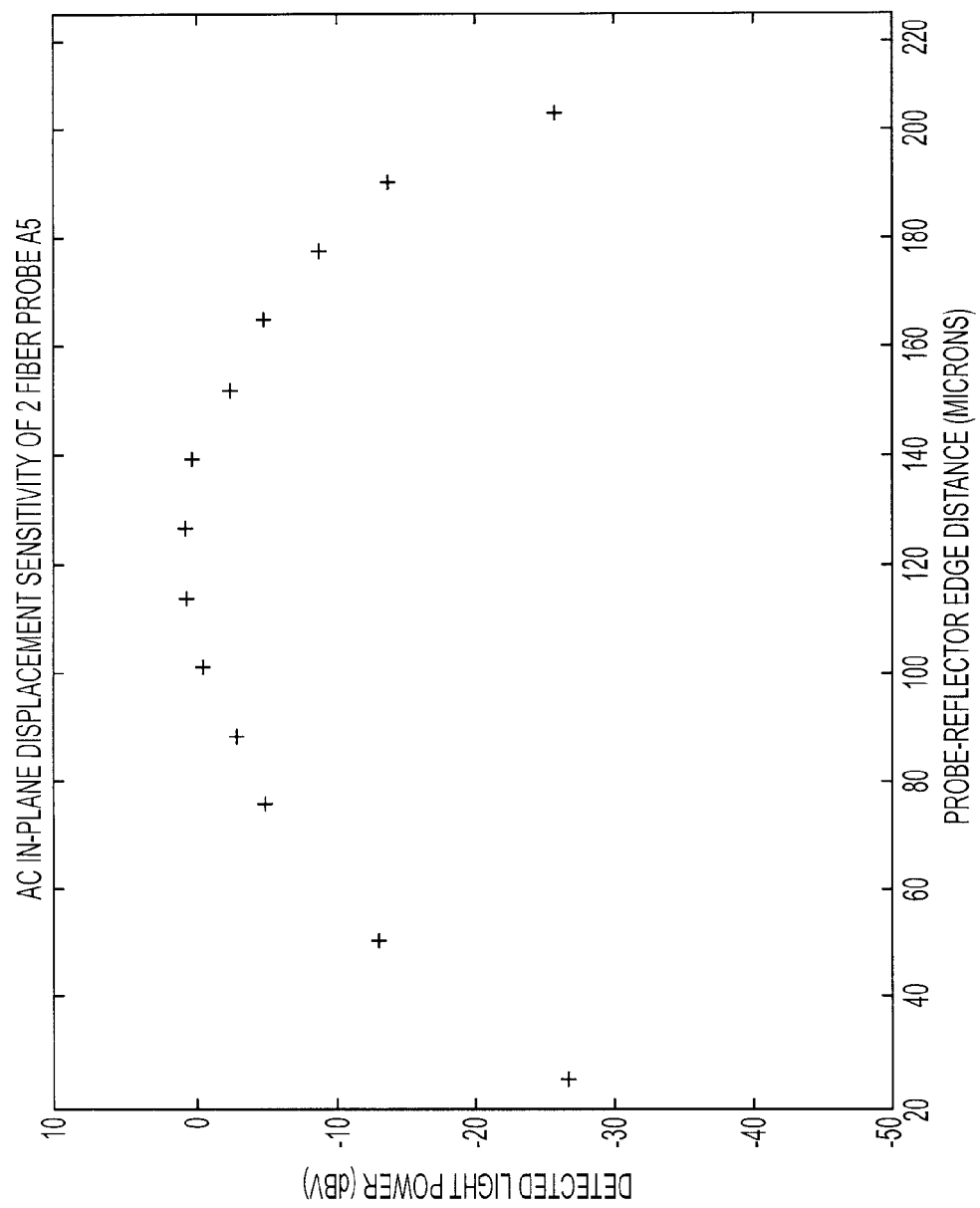
FIG. 11 illustrates the in-plane displacement sensitivity of the fiber optic sensor of FIG. 7.

FIG. 11 illustrates the in-plane displacement sensitivity of the fiber probe 71, obtained by electrically vibrating the reflector so it is displaced in the plane of the reflector, while holding the probe 71 in a fixed position. Maximum sensitivity occurs in a range of about 120 to about 140 micron probe-reflector edge distance T. The ac sensitivity in this range is calculated as $6.2 \times 10^{-11}$ Watts per Angstrom.

The noise of the FIG. 7 system, including the LEDs, the detectors, the fiber leads, and all the mountings, was measured using an OPF 370A Optek LED driven at 100 milliampere current by a LDX-3620 Lightwave Technology power supply in its battery operation mode and TIA-500 Terahertz PIN detector. The output of the TIA-500 PIN detector is stored in a 3582 HP spectrum analyzer. Based on this noise measurement and the 6.3 Watt/Angstrom displacement sensitivity, the minimum detectable displacement is calculated to be 0.16 Angstrom/(Hz$^{1/2}$).

FIG. 12A illustrates a fiber optic acceleration sensor 90 in accordance with an embodiment of the invention. The base 91 is attached to the structure or sample whose vibration is to be measured. For harmonic motion of the sample and base, normal displacement is Wo exp (−jωt), Wo is the amplitude, and ω is the angular frequency. The end of the cantilever, at x=0, is clamped to the base, and the other end, at x=L, is free. The fiber probe 93 is rigidly affixed to the base 91 so motion of the base is translated to the probe 93. A reflector 93 is affixed to the end of the cantilever 93. Because the cantilever 92 and the fiber probe 93 are both affixed to the base 91, the axial distance between the reflector and fiber probe is approximately constant.

The motion of the fixed end of the cantilever is the same as the motion of the base and the fiber optic probe. This displacement is W(0)=Wo exp(−jωt). The general solution for the cantilever motion is W(x,t)=(A exp(ikx)+B exp(kx)+C exp(−ikx)+D exp(−kx)) (exp(−iωt)), where k=ω$^{1/2}$[m/EI]$^{1/4}$, m is mass per unit length of the beam area, E is the Young's modulus of the beam material, I is the moment of the beam area, and I=dt$^3$/12 where d is the width and t is the thickness of the beam. M is the bending moment in the cantilever beam, and S is the shear force in the cantilever beam.

The following equations can be determined by applying boundary conditions at X=0 and X=L:

$W(0) = A + B + C + D = Wo \exp(-j\omega t)$ $(dW/dx) = \text{to } ikA + kB - ikC - kD = 0 \text{ at } x=0$ $M = -EI(\partial^2 W/\partial x^2) = 0 \text{ at } x = L$ $S = EI(\partial^3 W/\partial x^3) = 0 \text{ at } x = L$ These equations can be solved numerically for the coefficients A, B, C, and D using MATLAB or other suitable software techniques. The displacements W(0) and W(L) at the clamped and free ends can be calculated.

Light is transmitted through the transmitting fiber, emitted from the end of the transmitting fiber, and a portion of the light is reflected back into the receiving fiber. As seen in FIG. 12B, light is emitted from a transmitting fiber of the fiber probe. A portion of the light is reflected back into the receiving fiber of the fiber probe. The output signal from the receiving fiber is proportional to the relative transverse displacement between the reflector at the free end of the cantilever and the fiber probe (Po proportional to W(L)−W(0). Losses in the cantilever are included by incorporating a complex E=Eo exp(1−i tan lf), where lf is the loss factor. This model can also include a mass $m_L$ at the free end of the cantilever, which has the effect of lowering the resonance frequency of the cantilever by a controlled amount. Acceleration of the mass is maintained by the shear force in the beam. The boundary condition for S above becomes $$S=EI(\partial^3 W/\partial x^3)=m_L(\partial^2 W/\partial x^2) \text{ at } x=L.$$

FIG. 12B shows a two-fiber optical acceleration and displacement sensor together with the LED light source 97 supplying light to the transmitting fiber, and the PIN photodetector 98 receiving reflected light from the receiving fiber of the fiber probe.

In an exemplary embodiment, the accelerometer base is formed of an aluminum block approximately ⅞ inch in length and ¼ inch in width. The cantilever beam is formed of vinyl that is about 0.0565 inches by ½ inch by ¼ inch.

In this embodiment, the two fibers of the probe 93 each have a 200 micron glass core, a 230 micron plastic clad (HCS, Spectran Specialty Optics), a 500 micron Tefzel coating, and a numerical aperture of 0.37. The vinyl cantilever is glued to the aluminum base. The reflector is glued to the end of the cantilever. The reflector is a mylar film of 0.001 inch thickness, upon which a 300 nanometer thick layer of aluminum is evaporated. The two fiber probe 93 is carefully positioned with respect to the reflector. In this example, a thin layer of aluminum is included between the base and the fiber probe, and the aluminum layer 99 is polished until its thickness provides the desired transverse positioning between the fibers and the reflector. The fiber probe is glued to the aluminum layer.

The fiber optic acceleration and displacement sensor 90 of FIG. 12A-12B can be evaluated by mounting the sensor 90 and a reference accelerometer to a vibrator on an optical table. The vibrator is driven by a function generator and a power amplifier. The reference accelerometer is an Endevco model 2250A, the vibrator is B&K model 4810, the power amplifier is a Krohn-Hite 7500, and the function generator is a HP 3314A. The detector output is stored in a 3582A HP spectrum analyzer and a personal computer.

Figure 13A:
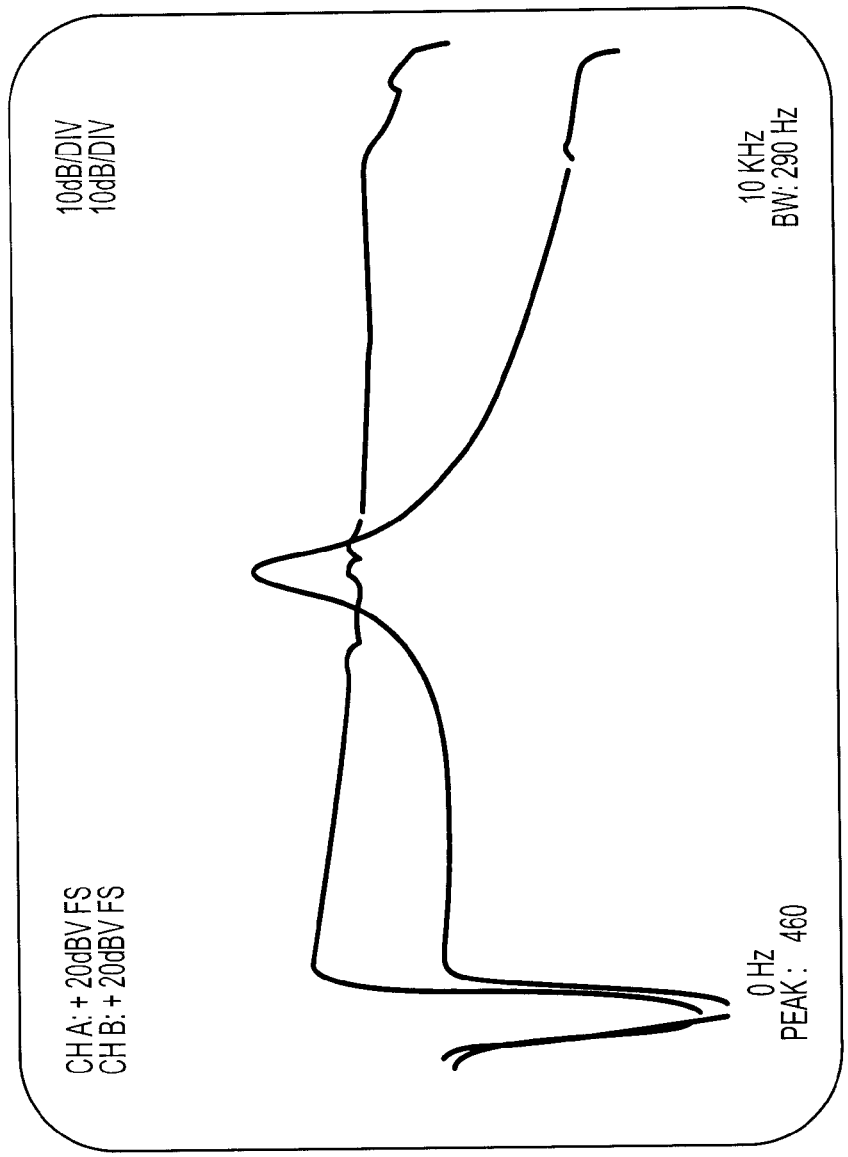
FIG. 13A shows the voltage output response of the sensor system of FIG. 12A-12B and the voltage output response of a reference accelerometer over a range of 0 to 10 kHz.

FIG. 13A shows the voltage output response 131 of the fiber sensor 90 and the voltage output response 132 of the reference accelerometer over a range of 0-10 kHz. Note that the reference accelerometer response 132 is relatively flat over the 1-10 kHz frequency range, but the response 131 of the fiber sensor 90 has a strong resonance at about 5 kHz.

Figure 13B:
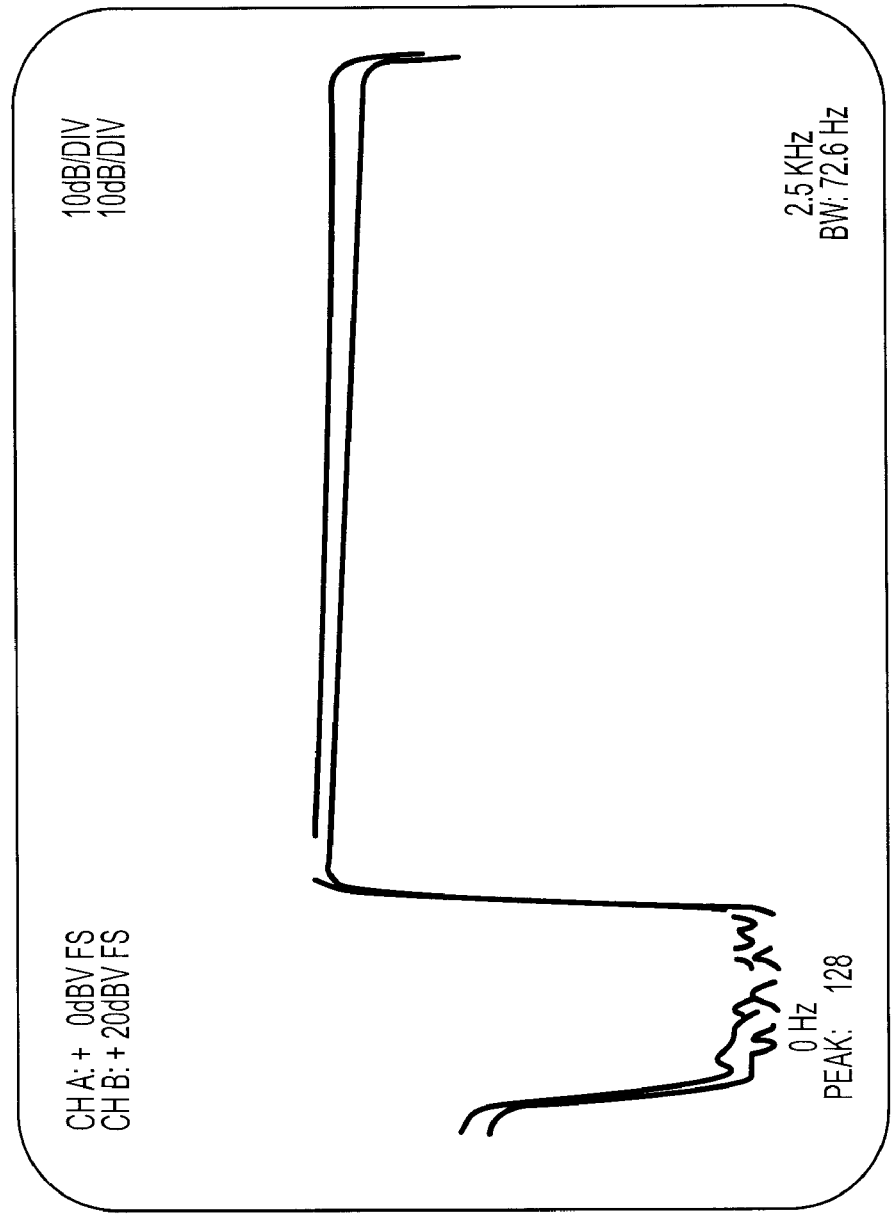
FIG. 13B shows the voltage output response of the sensor system of FIG. 12A-12B and the voltage output response of a reference accelerometer over a range of 0 to 2.5 kHz.

FIG. 13B shows the voltage output responses of the reference accelerometer and fiber sensor 90 over a range of 0 to 2.5 kHz, with the gain for the reference accelerometer decreased by 20 dB. Note that below the resonance point, the fiber sensor frequency response is very similar to the frequency response of the accelerometer. Thus, in the low frequency regime, the fiber sensor 90 acts as an accelerometer.

Figure 13C:
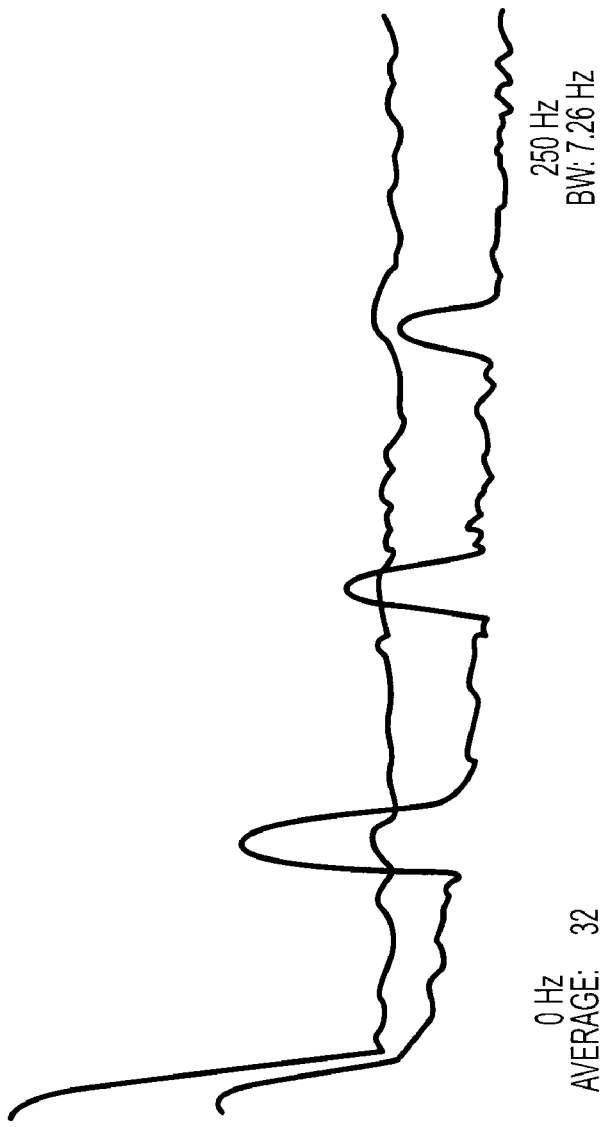
FIG. 13C shows the measured noise of the sensor system of FIG. 12A-12B and a reference accelerometer over a frequency range of 0 to 250 Hz.

FIG. 13C shows the measured noise of the fiber sensor 90 (channel A) and the reference accelerometer (channel B) over a frequency range of 0 to 250 Hz. Note that that the fiber sensor appears to be more immune to EMI than the electronic reference accelerometer.

The minimum detectable acceleration for the fiber sensor 90 can be found using FIG. 13A, 13B, and the measured fiber sensor noise of FIG. 13C. This minimum detectable acceleration is 0.4 mg/(Hz)$^{1/2}$.

Figure 13D:
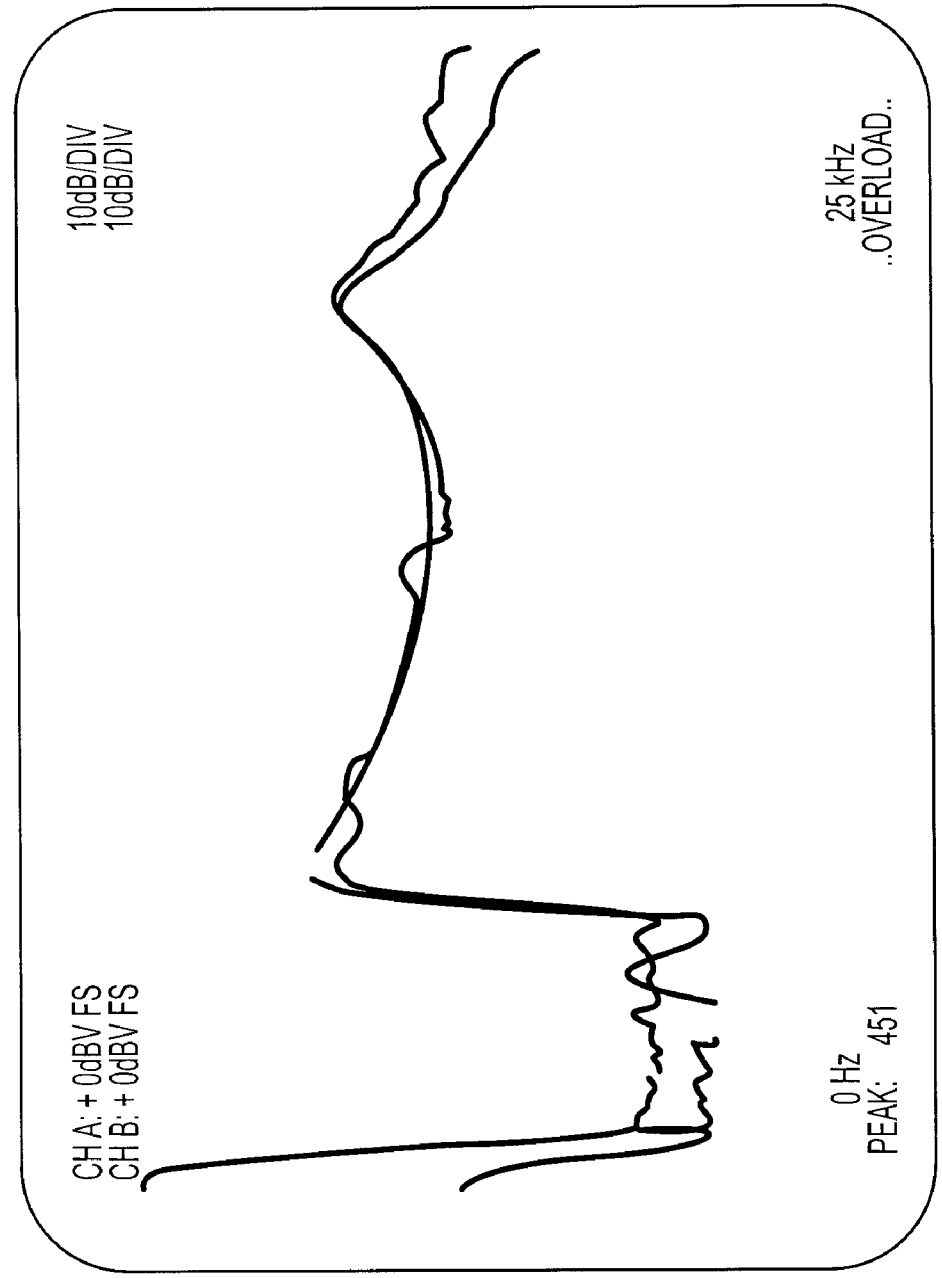
FIG. 13D shows the output voltage of a two-fiber optical probe and the output voltage of a seven fiber displacement probe over a frequency range of 7 kHz to 25 kHz.

The fiber sensor 90 of FIG. 12 can also be evaluated at higher frequencies by comparing it with a seven-fiber displacement probe instead of the model 2250 electronic reference accelerometer. A seven-fiber fiber optic displacement probe with one transmitting fiber and six surrounding receiving fibers is expected to have a sensitivity that is six times higher than a two-fiber (one transmitting fiber and one receiving fiber) sensor. In FIG. 13D, the Channel A curve shows the output voltage of a two-fiber probe and the channel B curve shows the output voltage of a seven fiber probe over a frequency range of 7 kHz to 25 kHz. Note that the responses are very similar in the ranges of 7 kHz to 20 kHz. Accordingly, in the frequency range of 7 kHz to 20 kHz, the probe acts as a displacement sensor.

At 17.5 kHz frequency, the minimum detectable displacement of the fiber sensor 90 is 0.02 Amperes/(Hz$^{1/2}$). At 5 kHz, the minimum detectable displacement is 0.00016 Amperes/(Hz$^{1/2}$).

Figure 14:
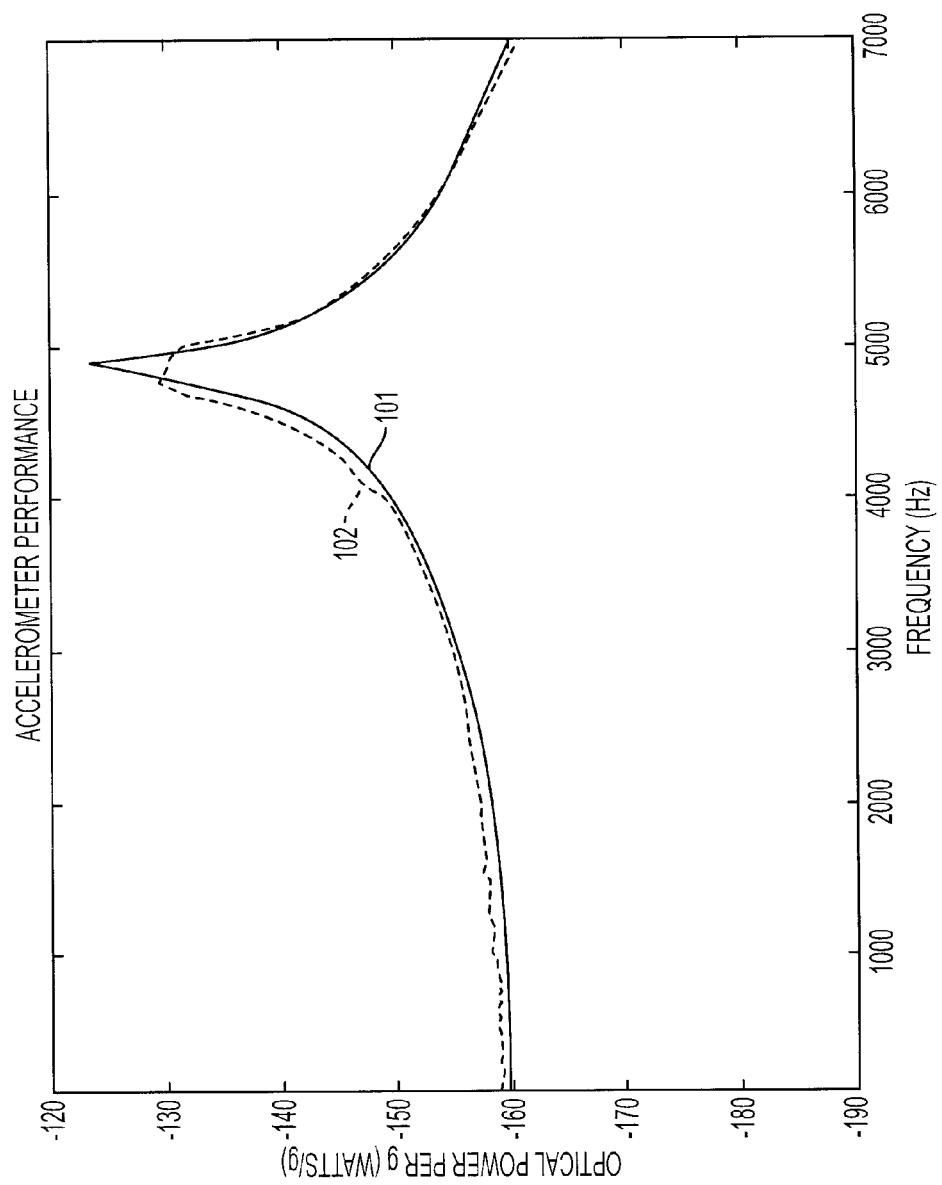
FIG. 14 shows an analytically obtained acceleration response and an experimentally obtained acceleration response of the sensor system of FIG. 12A-12B over a 100 Hz to 7 kHz range.

FIG. 14 shows the analytically obtained acceleration response 101 of the accelerometer of FIG. 12 and the experimentally obtained acceleration response 102 of the accelerometer of FIG. 12 in the 100 Hz to 7 kHz range. Since no published data was found for Young's modulus and a loss factor of vinyl, the Young's modulus and loss factor can be determined by fitting the measured height and frequency of the resonance frequency of the sensor to be Eo=3.0×10$^9$ Pa and loss factor lf=0.01. These values are consistent the value of Young's modulus for vinyl from J. D. N. Cheeke, "Fundamentals and Duplications of Ultrasonic Waves", CRC Press (Eo=4.1×10$^9$ Pa at 5 MHz).

Figure 15:
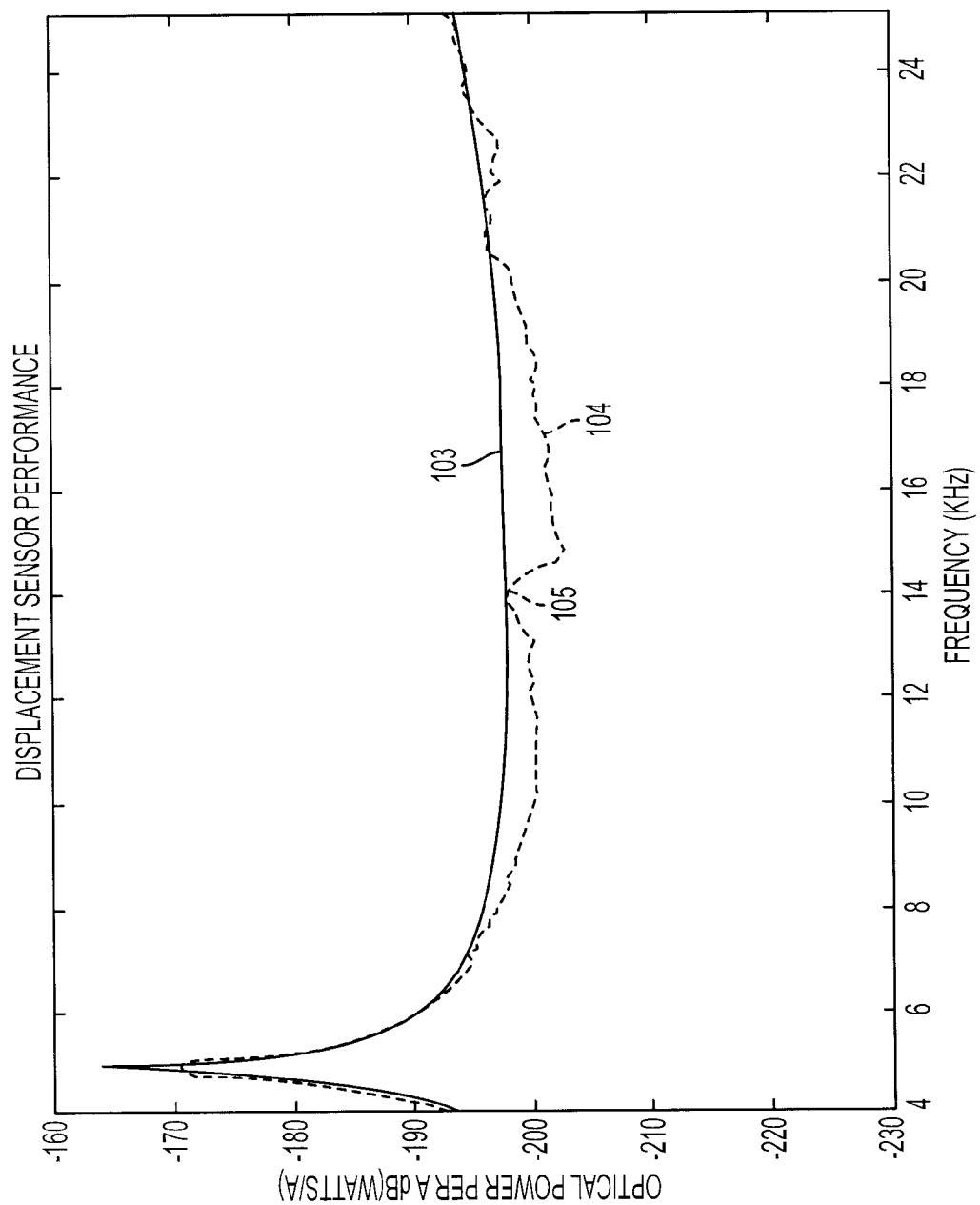
FIG. 15 shows an analytically obtained displacement response and an experimentally obtained displacement response of the sensor system of FIG. 12A-12B in the frequency range of 4 kHz to 25 kHz.

FIG. 15 shows the analytically obtained displacement response 103 and the experimentally obtained displacement response 104 of the sensor in the frequency range of 4-25 kHz. The small peak 105 shown in the experimental data at 14 kHz may be due to imperfect adhesion between the fiber sensor and the aluminum layer.

When the weight of a fiber optic sensor is increased, a decrease in the resonant frequency is expected. To verify this, a small weight can be glued near the end of the vinyl cantilever of FIG. 12. The weight is a brass piece 0.25 inch by 0.06 inch by 0.06 inch in size and 0.13 grams in mass.

Figure 16A:
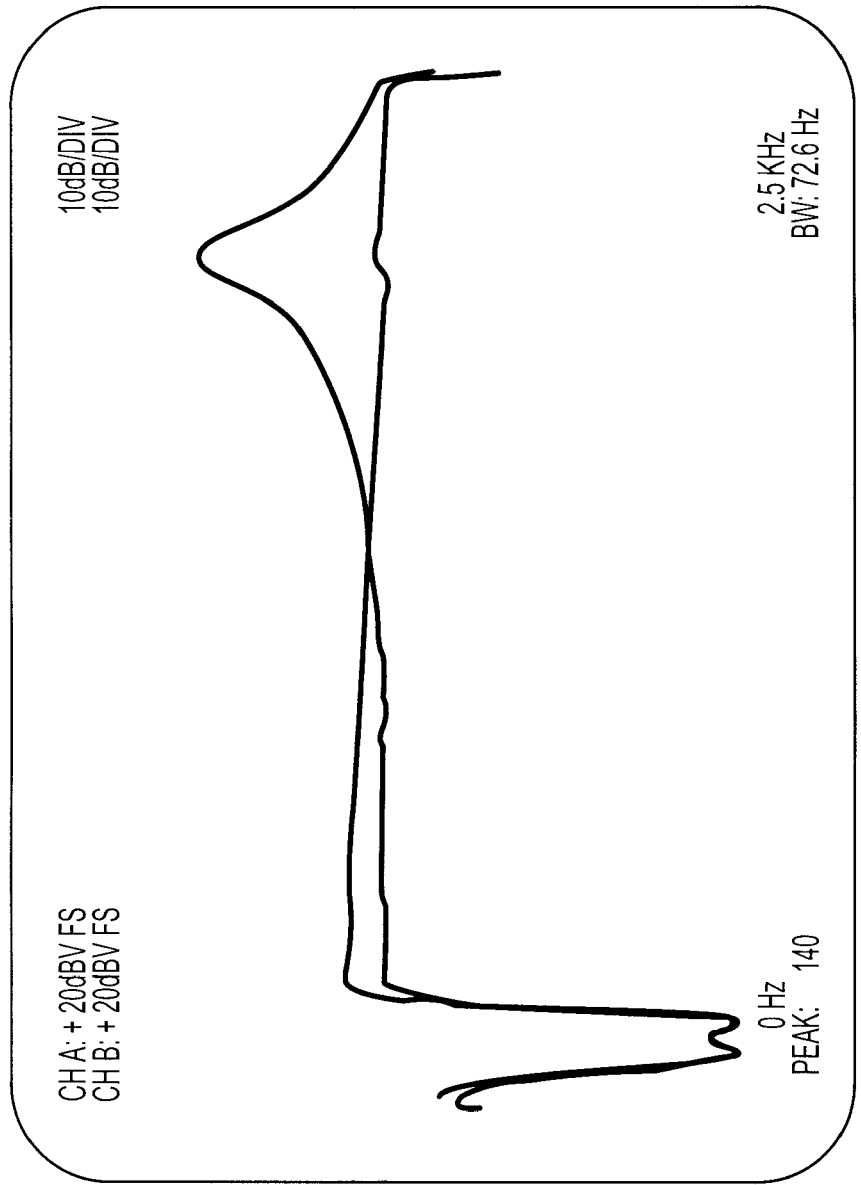
FIG. 16A shows the output signal from the sensor system FIG. 12A, with an added mass on the cantilever, and the output from a reference accelerometer.
Figure 16B:
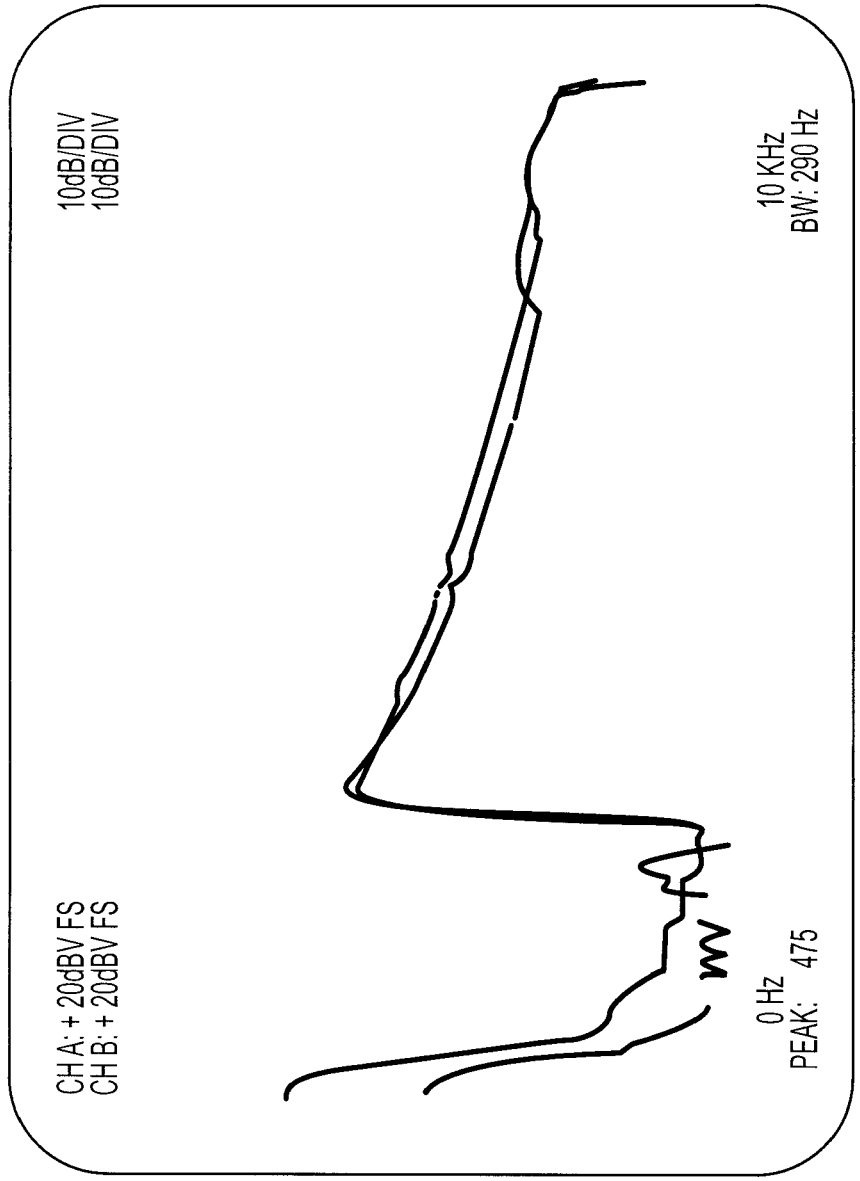
FIG. 16B shows the high frequency response of the sensor system FIG. 12A, with an added mass on the cantilever, over a frequency range of 3 to 10 kHz.

FIG. 16A shows the resulting signal from the fiber optic sensor 90 and the 2250 reference accelerometer. Note that the sensor's spring-mass resonance has decreased from 5 kHz to 2.1 kHz. Note that the fiber sensor acts as an accelerometer in the lower frequencies, and that the sensitivity of the fiber sensor to acceleration is higher with the added weight. The minimum detectable acceleration is calculated to be 0.1 gm/(Hz$^{1/2}$). This minimum detectable acceleration is four times less than that of the sensor without the added weight. FIG. 16B shows the sensor's high frequency response over a range of 3-10 kHz. The sensor's response is very similar to the response of the displacement probe, so the sensor appears to act as a displacement probe in this frequency range. The minimum detectable displacement is calculated as 0.05 Angstroms/(Hz$^{1/2}$). This is a higher result than for the sensor 90 without the added mass. Thus, an added mass at the end of the cantilever produces a sensor having greater acceleration sensitivity at the lower frequencies, and having lower displacement sensitivity at the higher frequencies.

Figure 17A:
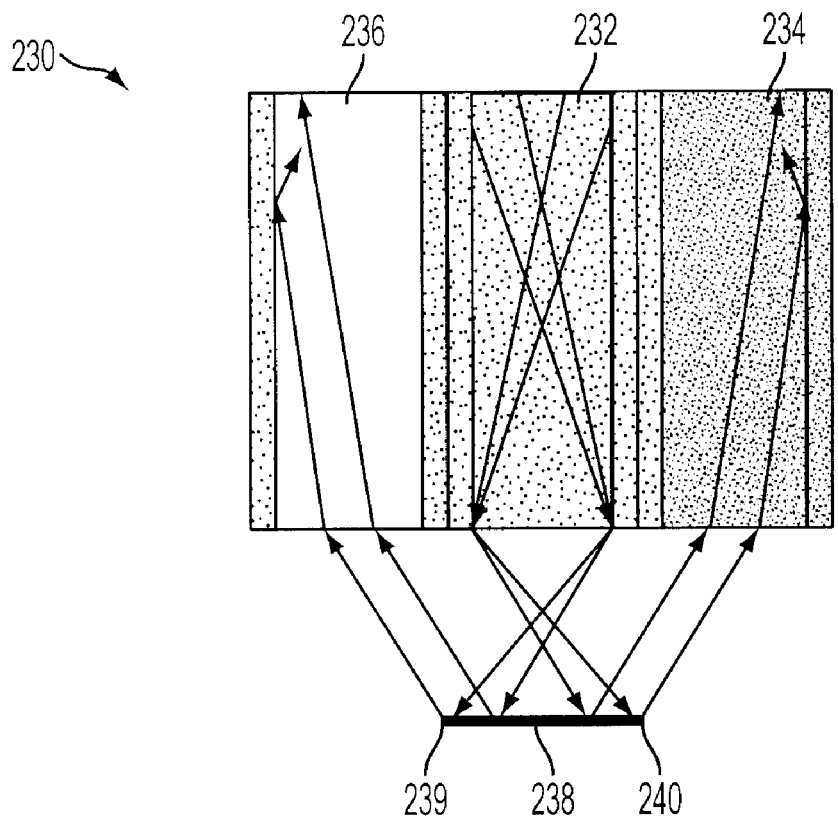
FIGS. 17A and 17B illustrate a fiber optic acceleration and displacement sensor in accordance with another embodiment of the invention.
Figure 17B:
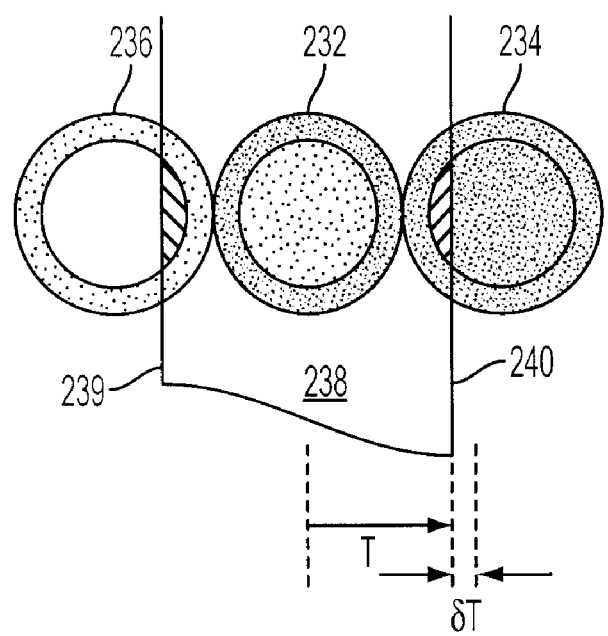

FIGS. 17A and 17B illustrate an intensity modulated acceleration and displacement sensor in accordance with another embodiment of the invention. The fiber probe 230 includes two receiving fibers 234 and 236 arranged on opposite sides of the central transmitting fiber 232. The reflector 238 is a narrow strip of reflective material, having a width that is greater than the diameter of the central transmitting fiber and less than the added diameters of the transmitting and receiving fibers. The fiber probe 230 is positioned so that the reflector 238 is located symmetrically with respect to the transmitting fiber 232, and the reflector 238 extending over a portion of the cores of both fibers 236 and 238.

The reflector 238 moves in the lateral or "transverse" direction with respect to the axis of the fiber probe. As the reflector covers more of one fiber and less of the other fiber, the amount of light reflected into the fibers changes. The location of the edges 239 and 240 of the reflector strip 238 determine the amount of light reflected into the receiving fibers 234 and 236.

A small transverse displacement dT in the reflecting strip 238 causes a change in light power $dP_{o1}$ in the receiving fiber 236 and an equal but opposite change $dP_{o2}$ in the light power in the receiving fiber 238. The ac signals transmitted through the receiving fibers to the photodetectors are equal in amplitude and opposite in phase. Once converted into electrical signals by the photodetector, one signal can be subtracted from the other, to produce a stronger signal with less noise.

Figure 18A:
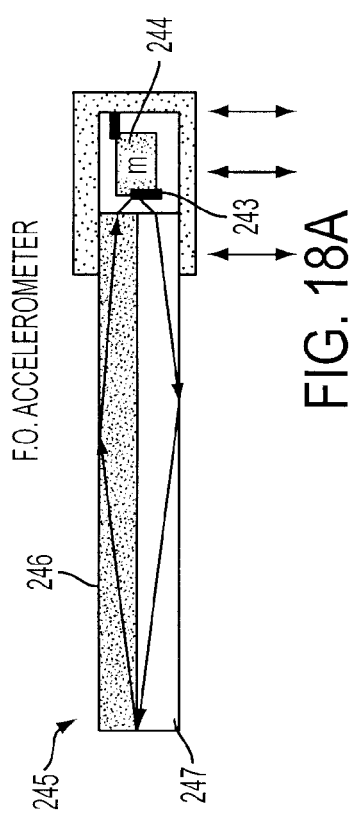
FIG. 18A and FIG. 18B illustrate a fiber optic acceleration and displacement sensor having a very small micromachined cantilever.
Figure 18B:
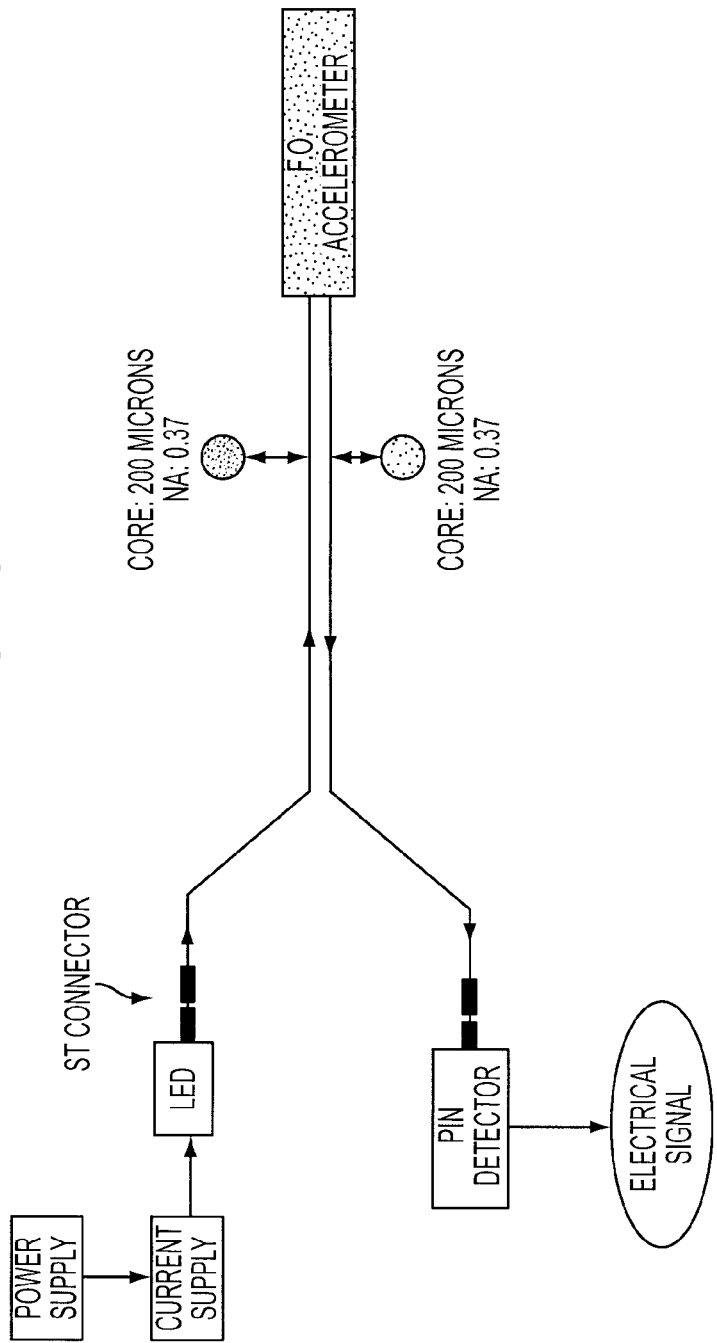

In other exemplary embodiments of the invention shown in FIG. 18A and FIG. 18B, a very small micromachined cantilever is used with a fiber probe to form a miniature accelerometer and displacement sensor. Light from a transmitting fiber 246 of the fiber probe 245 is reflected by a reflector 243 on a micromachined cantilever 244. Light is reflected into the receiving fiber 247 and transmitted to a photodetector. The end of the fiber probe 245 and the cantilever 244 with the edge reflector 243 are enclosed in a protective enclosure 245. The protective enclosure can be sealed to prevent contaminants from entering the enclosure. The enclosure is glued or otherwise affixed to a structure whose acceleration is to be measured.

Figure 19A:
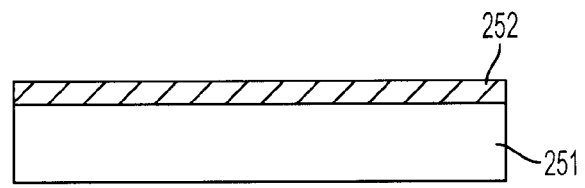
Figure 19B:
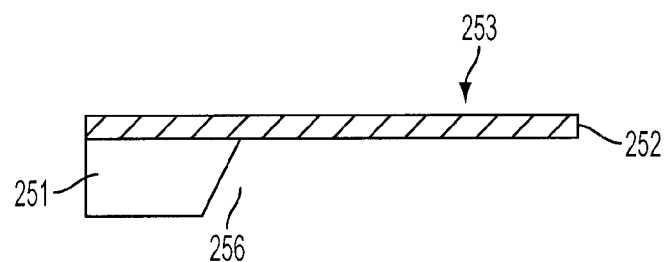
Figure 19C:
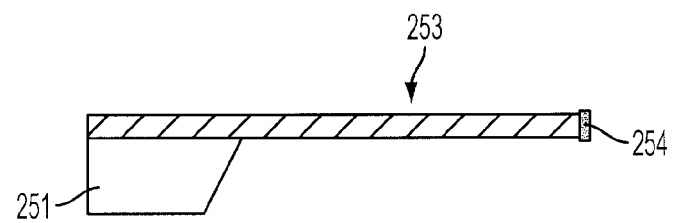
Figure 19D:
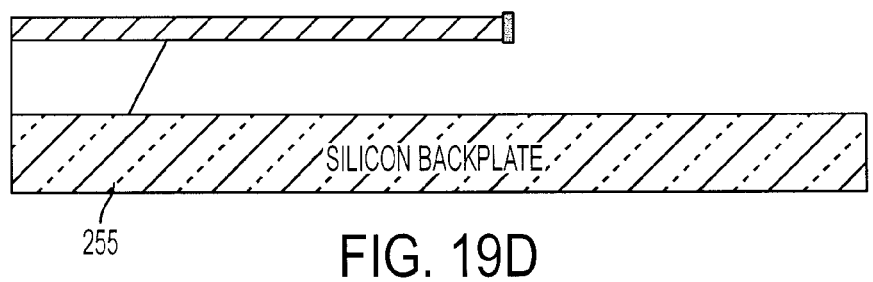

FIG. 19A-19F show a technique for forming a micro-machined cantilever for use in fiber optic accelerometer and displacement sensors. A silicon wafer 251 has a thin epitaxial layer 252 of silicon dioxide (SiO2). As shown in FIG. 19B, a portion of the silicon wafer 251 is etched away from the silicon dioxide layer, forming a thin silicon dioxide cantilever 253 and a cavity 256. A reflecting strip 254 is deposited on the end face of the silicon dioxide cantilever 253, as shown in FIG. 19C. A silicon backplate 255 is glued to the silicon wafer 251. The silicon backplate 255 forms the mounting base of the fiber optic probe. As shown in FIG. 19E, the fiber optic probe 260 is moved into position near the reflector, and moved in a direction normal to the plane of the reflector while the reflected light is monitored. When the reflected light reaches a maximum, the probe is moved in a direction parallel to the plane of the reflector until maximum displacement sensitivity is reached. The probe 260 is then affixed with adhesive to the silicon backplate 255 at the optimized position. As shown in FIG. 23F, a cap wafer 261 can be placed over the cantilever and the fiber probe, and glued to the fiber probe 260 and to the fixed end of the cantilever 252, so the free end 253 of the cantilever 252 is free to vibrate in response to the displacement or acceleration of the backplate 255.

The cap wafer 261 is optional, however it can protect the fiber optic sensor optically and mechanically and can act as a damper, improving the sensor performance.

FIG. 20A-20F illustrate a method for forming a fiber optic accelerometer with a silicon cantilever, the silicon cantilever having an added mass.

Figure 20A:
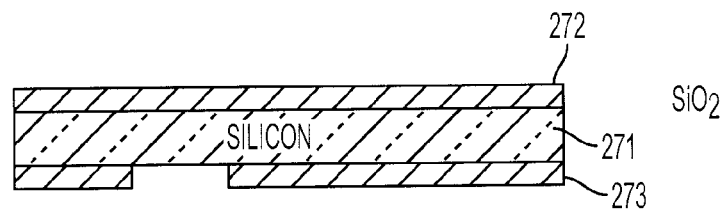
Figure 20B:
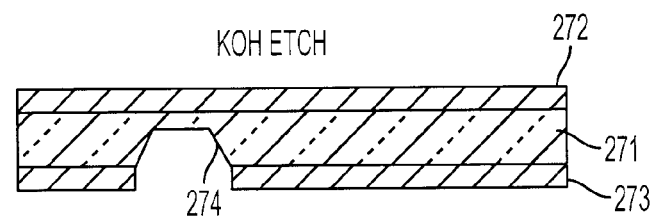
Figure 20C:
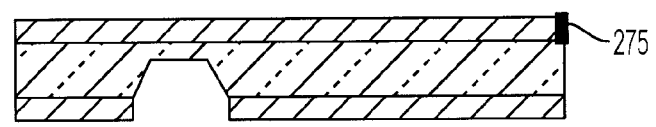
Figure 20D:
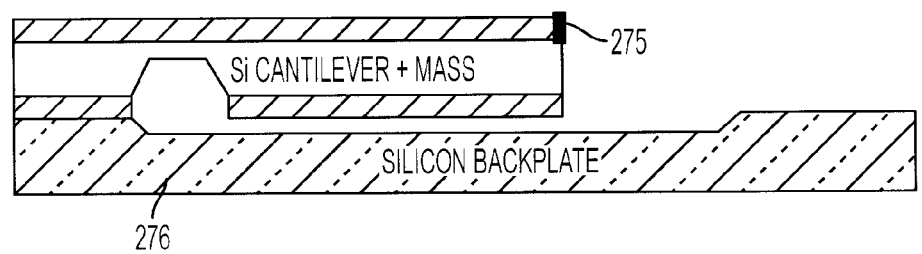
Figure 22C:
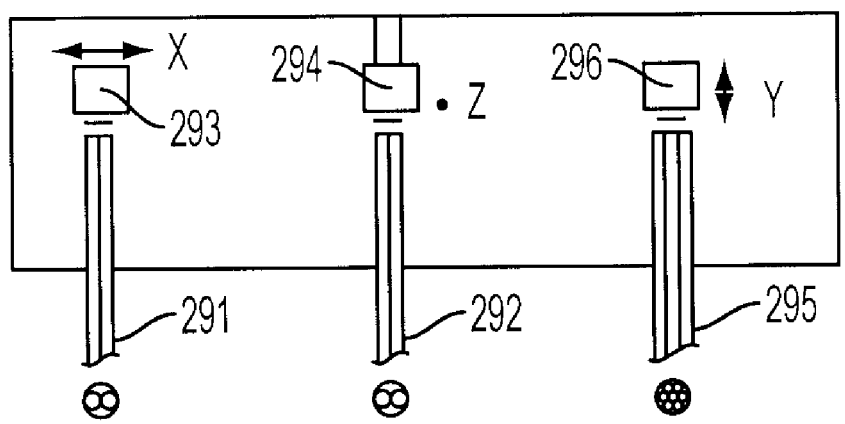

As shown in FIG. 20A, a silicon wafer 271 has thin layers of silicon dioxide (SiO2) 272 and 273 on both surfaces of the silicon wafer. A portion of the silicon dioxide layer 273 is etched away using photolithography. A portion 274 of the silicon wafer is etched away using KOH. An edge reflector 275, which can be aluminum or another reflective material, is evaporated in the glass strip. A silicon backplate 276 is glued to the silicon dioxide wafer on one side of the KOH etched region 274, forming a fixed end of the cantilever and a free end of the cantilever. The fiber probe 260 is aligned and affixed to the backplate, and the optional cap wafer is affixed to the fiber probe 260 and the cantilever as discussed in the paragraphs describing FIGS. 19E and 19F. The unetched portion of the silicon wafer 271 and the additional silicon dioxide later 273 provided added mass to the cantilever, compared to the cantilever of FIG. 19A-19F. The additional mass, the geometry, and the elastic modulus of the cantilever determine the sensitivity and bandwidth of the fiber optic acceleration and displacement sensor.

Although the fiber optic probe shown in FIG. 19E-19F and FIG. 20E-20F is a two fiber probe, embodiments of the invention can include other fiber probes, such as, the symmetric three fiber probe of FIG. 17.

FIG. 21A-21F illustrates an embodiment of a triaxial fiber optic sensor system 280 that can measure acceleration or displacement in three perpendicular axes. FIG. 21B is a side view of the sensor system, and FIG. 2C is a top view of the sensor system. The sensor includes three two-fiber probes 281, 282, and 283, each of which is aligned with a micromachined cantilever 284, 285, 286. The three cantilevers have a fixed end attached to the enclosure 287 so that one of the cantilevers has motion in the x direction, a second cantilever has motion in the y direction, and the third has displacement in the z direction. An edge reflector is positioned at the free end of each of the cantilevers in the manner discussed above. The enclosure or housing 287 is affixed to the structure whose acceleration and displacement are to be measured.

FIG. 22A-22F illustrate an embodiment of a triaxial fiber optic sensor system 290 that can measure acceleration or displacement in three perpendicular axes x, y, and z. The sensor includes two two-fiber probes 291, 292, which are aligned with two micromachined cantilevers 293, 294, each of which as an edge reflector attached to the free end. The cantilevers are arranged so that motion of the enclosure causes one to be displaced in the x direction and the other to be displaced in the z direction. The third probe 295 is a displacement or acceleration probe that can measure out of plane displacement or acceleration in the y direction by reflection of transmitted light from a reflector affixed to the free end of a cantilever 296 that can move in the y direction. The ability of the third probe 295 to measure out of plane displacement or acceleration allows the three fiber probes to enter the enclosure from the same direction. The fibers leading to the probes 291, 292, 295 can be bundled together on the outside of the enclosure 297, and can pass through the same opening or different openings in the enclosure.

The out-of-plane displacement or acceleration sensor 295 comprises a single central transmitting fiber, surrounded by a number of receiving fibers. In this example, six receiving fibers surround the transmitting fiber. The intensity of the reflected light received in the receiving fibers indicates the acceleration or displacement of the cantilevered reflector in the y direction. Examples of seven fiber probes are described in J. A. Bucaro and N. Lagakos, "Fiber Optics Pressure and Acceleration Sensors", Proceeding of the 47th International Instrument symposium, Denver, Colo. (May 6-10, 2001), and in U.S. Pat. Nos. 7,020,354, 7,379,630, 7,149,374, and U.S. Patent Publication No. 20060072887, the entire disclosure of each of which is incorporated herein by reference.

Figures 23A, 23B:
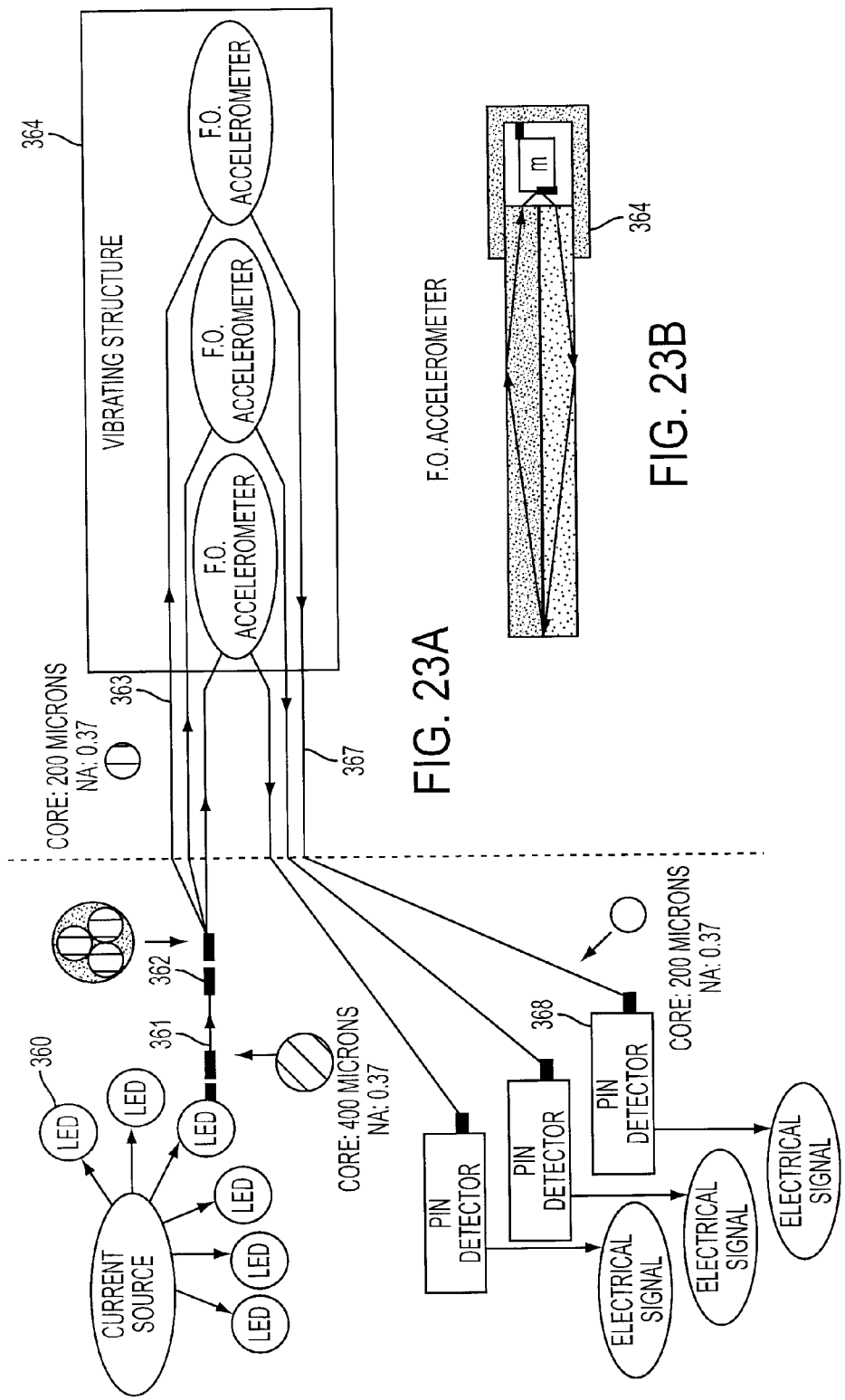
FIG. 23A-23B illustrate a multiplexed acceleration and displacement sensor system according to an embodiment of the invention.

FIG. 23A and FIG. 23B illustrate a multiplexed acceleration and displacement sensor system according to an embodiment of the invention. To illustrate a multiplexing system, a two-fiber probe sensor is shown, however, the other fiber probes and sensors described herein can also be multiplexed in this manner.

Each LED 360 is coupled to a length of large diameter optical fiber 361. Smaller diameter optical fibers 363 are arranged to receive light from the larger diameter optical fiber 361 at a connector 362. In this example, the larger diameter optical fiber is 400 microns in diameter, has a numerical aperture of 0.37, and is about six inches in length. The three 200 micron core diameter optical fibers 363 are arranged to receive equal amounts of light from the larger diameter optical fiber 119. Although various connectors can be used, it is preferred that the connectors maintain the smaller optical fiber with a large part of its core area abutting the core of the larger diameter fiber.

The short six inch larger diameter optical fiber 361 couples the LED more uniformly into the transmitting fibers 363 than arranging the three fibers to receive the light from the LED directly. Each of the optical fibers extends to and supplies light to a different sensor 364.

The sensor 364 can be one of the two-fiber or three-fiber sensors described herein, or another acceleration or displacement sensor.

Receiving optical fibers of the sensors 364 receive the reflected light, as discussed in previous paragraphs. The receiving fibers can transmit the light directly to the photodetectors 368, or can be coupled to lengths of fiber via connector pairs for transmission to the photodetectors. The photodetectors convert the received light from the fiber optic sensors to electrical signals.

The FIG. 23 fiber optic acceleration and displacement sensor has a minimum detectable acceleration of about 0.7 mg/ (Hz1/2).

Figures 24A, 24B:
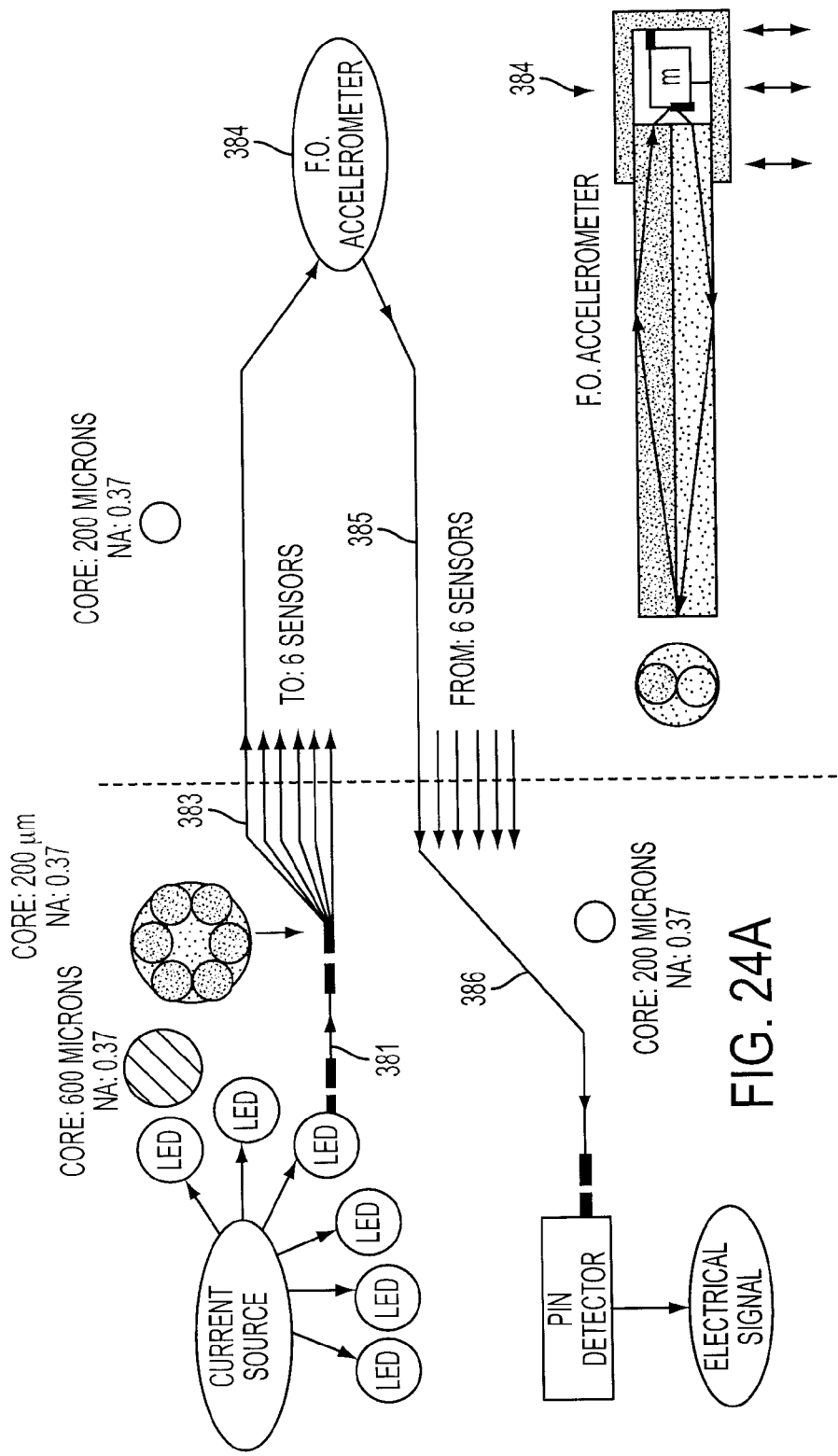
FIG. 24A-24B illustrate a multiplexed acceleration and displacement sensor system in which each LED drives six fiber optic sensors.

More or fewer than three optical fibers can be used to receive light from the larger diameter optical fiber 363. For example, FIG. 24 illustrates a sensor system in which each LED drives six fiber optic sensors. The larger diameter optical fiber 381 with a core diameter of 600 microns and a numerical aperture of 0.37 efficiently supplies six 200 micron core diameter fibers 383 with light, allowing each current source to power thirty six sensors 384.

A 600 micron core diameter fiber 386 can be arranged to receive light from six 200 micron diameter fibers that transmit reflected light from the sensors 384. The larger diameter fiber 386 transmits light into a sensor. Alternately, light from a sensor can be carried through a smaller diameter fiber to a PIN detector that receives light from only that sensor.

The following list identifies suitable components are suitable for the sensors and sensor devices, although it will be recognized that many other components may also be used. One suitable current source is manufactured by Wavelength Electronics, model no. LDD200-1M. LEDs can be the OPF370A models at 100 mA supplied by Optek. Suitable 200 micron core diameter fiber is manufactured by OFS, headquartered in Norcross, Ga., USA, and is identified by model number CF01493-10. Suitable 400 micron core diameter fiber is manufactured by OFS, identified as model number CF01493-12. Suitable 600 micron core diameter fiber is manufactured by OFS, identified as model number CF01493-14. A suitable PIN detector is manufactured by Advanced Photonics, headquartered at Camarillo, Calif., USA, and identified by model number SD 100-41-21-231. Suitable fiber, PIN, and LED connectors are available from Fiber Instrument Sales (FIS), headquartered in Oriskany, N.Y., USA, and identified by model numbers #F1-0061830 and #5014741. Connectors can be modified if necessary to accommodate the larger diameter optical fibers and the multiple smaller diameter fibers to be connected.

Suitable connectors are described in patent application Ser. No. 11/250,708, the specification of which is incorporated by reference herein in its entirety.

Note that while the edges of the edge reflector have been shown as straight and as perpendicular to a line drawn through the centerlines of the transmitting and receiving fibers, the reflector edge can instead be curved or irregular, or can form a non-perpendicular angle with the line between the fiber centerlines.

Although this invention has been described in relation to the exemplary embodiments thereof, it is well understood by those skilled in the art that other variations and modifications can be affected on the preferred embodiment without departing from scope and spirit of the invention as set forth in the appended claims.

What is claimed as new and desired to be protected by Letters Patent of the United States is:

1. A fiber optic sensor for detecting acceleration or displacement, the sensor comprising:
   a fiber optic probe having a transmitting multimode optical fiber and at least one receiving multimode optical fiber, the transmitting fiber and the receiving fiber being substantially parallel to a longitudinal axis of the probe, and
   a reflective surface spaced apart from the fiber probe, the reflective surface able to move in a direction substantially normal to the longitudinal axis of the fiber optic probe, the reflective surface having an edge extends over at least one of the optical fiber ends,
   wherein in operation, said transmitting fiber transmits light toward the reflector, said reflector transmits a portion of the light toward the receiving fiber, wherein an amount of light received by the receiving fiber indicates a relative acceleration or a relative displacement of the reflective surface with respect to the fiber probe in the direction of motion of the reflective surface.

2. The sensor according to claim 1, further comprising:
   a cantilever, the reflective surface being positioned at a free end of a cantilever,
   wherein in operation, the fixed end of the cantilever is fixed to a structure for measurement of the acceleration or displacement of the structure.

3. The sensor according to claim 2, wherein the amount of light received by the receiving fiber indicates a relative acceleration at frequencies below the spring-mass resonance frequency of the sensor, and indicates the relative displacement at frequencies above the spring-mass resonance frequency of the sensor.

4. The sensor according to claim 1, further comprising:
   a photodetector in optical communication with the receiving fiber; and
   a light source in optical communication with the transmitting fiber.

5. The sensor according to claim 1, wherein the edge of the reflector is straight and is perpendicular to a line between centerlines of the transmitting fiber and one of the receiving fibers.

6. The sensor according to claim 1, wherein normalized light output power is $$Po/Pi=(2/\pi)\int_{m-1}^{t}(I_k/I_o)\sigma_1 k_1 dk_1+(2/\pi)\int_{t}^{Z}(I_k/I_o)\sigma_2 k_2 dk_2,$$

where $Z=(1-m^2+2mt)^{1/2}$, $I_k/I_o$ is normalized intensity, $I_o$ is intensity exiting the transmitting fiber, $I_o=P_i/(2k_i x_o^2)$, $\sigma_1=\theta_1=\cos^{-1}[(k_1^2+m^2-1)/(2k_1 m)]$, $\sigma_2=\theta_2-\theta$, $\theta_2=\cos^{-1}[(k_2^2+m^2-1)/(2k_2 m)]$, $\theta=\cos^{-1}(k/k_2)$, for light rays exiting the transmitting fiber at angles $\theta$ with respect to the fiber axis, and m is the dimensionless distance between the center of the transmitting fiber and the center of the receiving fiber.

7. The fiber optic sensor according to claim 2, further comprising:
a housing enclosing the end of the fiber probe and the cantilever, the housing being fixed to the structure.

8. A fiber optic sensor for detecting acceleration or displacement, the sensor comprising:
a fiber optic probe having a transmitting multimode optical fiber and at least two receiving multimode optical fibers, the transmitting fiber and the receiving fibers being substantially parallel to a longitudinal axis of the probe,
a reflective surface spaced apart from the fiber probe in a direction along the longitudinal axis, the reflective surface able to move in a direction substantially normal to the longitudinal axis of the fiber optic probe, the reflective surface extending over the transmitting fiber, the reflective surface having an edge extending over a first of the receiving fibers and a second edge extending over a second of the receiving fibers,
wherein in operation, said transmitting fiber transmits light toward the reflector, said reflector transmits a portion of the light toward the receiving fibers, wherein an amount of light received by the receiving fibers indicates a relative acceleration or a relative displacement of the reflective surface with respect to the fiber probe in the direction of motion of the reflective surface.

9. The fiber optic sensor according to claim 8, wherein the first edge and the second edge are parallel.

10. The fiber optic sensor according to claim 8, wherein the reflective surface is mounted to the free end of a cantilever, wherein in operation, the fixed end of the cantilever is fixed to a structure for measurement of the acceleration or displacement of the structure.

11. A fiber optic sensor system, comprising:
at least one optical source,
a plurality of optical fibers arranged to receive optical energy from the optical source,
a plurality of fiber optic sensors according to claim 1,
each of the optical fibers transmitting optical energy to one of the fiber optic sensors.

12. A method for forming a fiber optic acceleration or displacement sensor having an edge reflector fixed to a cantilever, the method comprising:
providing a silicon wafer with a epitaxial layer of silicon dioxide, etching away a portion of the silicon wafer to form a thin silicon dioxide cantilever, depositing a reflecting strip on an end face of the silicon dioxide cantilever, affixing a silicon backplate to an unetched portion of the silicon wafer, and affixing a fiber optic probe in position so an end of a transmitting fiber and an end of a receiving fiber are facing the reflective surface with an edge of the reflective strip overlying at least one of the transmitting fiber and the receiving fibers.

13. The method according to claim 12, further comprising:
positioning a cap wafer over the cantilever and the fiber probe, and adhering the cap wafer to the fiber probe and to a fixed end of the cantilever, with a free end of the cantilever free to vibrate in response to the displacement or acceleration of the backplate in a transverse direction with respect to a longitudinal axis of the fiber probe.

14. A fiber optic sensor for detecting acceleration or displacement, the sensor comprising:
a fiber optic probe having a transmitting multimode optical fiber and at least one receiving multimode optical fiber, the transmitting fiber and the receiving fiber being substantially parallel to a longitudinal axis of the probe; and
a reflective surface affixed to a free portion of a cantilever beam, said cantilever beam adapted to be affixed to a structure for measurement of acceleration or displacement of the structure, the free portion of the cantilever beam and the reflective surface arranged to move in a direction substantially perpendicular to the longitudinal axis of the fiber optic probe,
the reflective surface being spaced apart from the fiber probe,
the reflective surface having an edge extending over at least one of the optical fiber ends,
wherein in operation, said transmitting fiber transmits light toward the reflective surface and said reflective surface reflects a portion of the light toward the receiving fiber,
wherein an amount of light received by the receiving fiber indicates a relative acceleration or a relative displacement of the reflective surface with respect to the fiber probe in a direction perpendicular to the longitudinal axis of the fiber probe.

15. A fiber optic sensor for detecting acceleration or displacement, the sensor comprising:
a fiber optic probe having a transmitting multimode optical fiber and at least one receiving multimode optical fiber, the transmitting fiber and the receiving fiber being substantially parallel to a longitudinal axis of the probe; and
a reflective surface spaced apart from the fiber probe, the reflective surface able to move in a direction substantially perpendicular to the longitudinal axis of the fiber optic probe, the reflective surface having an edge extends over at least one of the optical fiber ends,
wherein in operation, said transmitting fiber transmits light toward the reflector, said reflector transmits a portion of the light toward the receiving fiber, wherein an amount of light received by the receiving fiber indicates a relative acceleration or a relative displacement of the reflective surface with respect to the fiber probe in a direction perpendicular to the longitudinal axis of the fiber probe.

* * * * *